United States Patent
Ma

(10) Patent No.: US 10,750,357 B2
(45) Date of Patent: Aug. 18, 2020

(54) DATA TRANSMISSION METHOD AND APPARATUS, AND RELATED DEVICE

(71) Applicant: Huawei Technologies Co., Ltd., Shenzhen (CN)

(72) Inventor: Jie Ma, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 114 days.

(21) Appl. No.: 16/053,396

(22) Filed: Aug. 2, 2018

(65) Prior Publication Data
US 2018/0343558 A1    Nov. 29, 2018

Related U.S. Application Data

(63) Continuation of application No. PCT/CN2016/073544, filed on Feb. 4, 2016.

(51) Int. Cl.
*H04W 8/24* (2009.01)
*H04W 8/20* (2009.01)
(Continued)

(52) U.S. Cl.
CPC ........... *H04W 8/24* (2013.01); *H04L 61/2007* (2013.01); *H04W 8/20* (2013.01); *H04W 72/04* (2013.01);
(Continued)

(58) Field of Classification Search
None
See application file for complete search history.

(56) References Cited

U.S. PATENT DOCUMENTS

2006/0141928 A1* 6/2006 Hosokawa ............ H04B 17/40
                                                                    455/9
2011/0092236 A1   4/2011 Iwamura et al.
(Continued)

FOREIGN PATENT DOCUMENTS

CN         102369765 B    3/2012
CN         102469509 A    5/2012
(Continued)

OTHER PUBLICATIONS

S2-133366 NEC, "L2 ProSe UE-to-Network Relay alternative", SA WG2 Meeting #S2-99, Sep. 23-28, 2013, Xiamen, China, total 8 pages.

*Primary Examiner* — Peter Chen
(74) *Attorney, Agent, or Firm* — Leydig, Voit & Mayer, Ltd.

(57) ABSTRACT

A data transmission method and apparatus, and a related device are disclosed. The data transmission method includes: adding, by first UE, a first RBID and/or terminal identifier information of the first UE to data that needs to be sent, where a first RB corresponding to the first RBID is located between the first UE and a network side device, the first RBID is allocated to the first UE by the network side device, the terminal identifier information is a layer 2 identifier of the first UE, the layer 2 identifier is used to instruct an access network to identify the first UE, and the terminal identifier information includes a C-RNTI, an IP address, a TMSI, or an IMSI; and sending, by the first UE, the data to which the first RBID and/or the terminal identifier information is added to second UE.

10 Claims, 11 Drawing Sheets

(51) Int. Cl.
   *H04W 88/04*   (2009.01)
   *H04L 29/12*   (2006.01)
   *H04W 72/04*   (2009.01)
   *H04W 76/20*   (2018.01)
   *H04W 80/02*   (2009.01)
   *H04W 88/02*   (2009.01)

(52) U.S. Cl.
   CPC ............ *H04W 88/04* (2013.01); *H04W 76/20* (2018.02); *H04W 80/02* (2013.01); *H04W 88/02* (2013.01)

(56) References Cited

U.S. PATENT DOCUMENTS

2012/0020278 A1*  1/2012  Moberg ................ H04B 7/155
                                                                    370/315
2016/0286437 A1   9/2016  Enomoto et al.
2016/0360563 A1* 12/2016  Lecroart ............... H04L 69/322
2017/0078945 A1   3/2017  Ma et al.

FOREIGN PATENT DOCUMENTS

| | | |
|---|---|---|
| CN | 102369765 B | 2/2014 |
| CN | 105101301 A | 11/2015 |
| EP | 3136786 A1 | 3/2017 |
| GB | 2493782 A | 2/2013 |
| JP | 2017511982 A | 4/2017 |
| WO | 2009157432 A1 | 12/2009 |
| WO | 2010088804 A1 | 8/2010 |
| WO | 2010107357 A1 | 9/2010 |
| WO | 2012122670 A1 | 9/2012 |
| WO | 2014117858 A1 | 8/2014 |
| WO | 2015068732 A1 | 5/2015 |
| WO | 2015125479 A1 | 8/2015 |

\* cited by examiner

DATA TRANSMISSION METHOD AND APPARATUS, AND RELATED DEVICE

CROSS-REFERENCE TO RELATED APPLICATIONS

This application is a continuation of International Application No. PCT/CN2016/073544, filed on Feb. 4, 2016, the disclosure of which is hereby incorporated by reference in its entirety.

TECHNICAL FIELD

The present application relates to the field of information processing technologies, and in particular, to a data transmission method and apparatus, and a related device.

BACKGROUND

A device-to-device (D2D) communication manner refers to that a transmit end directly sends data to a receive end by using an electromagnetic wave, and the data does not need to be forwarded by a base station or a cellular network. However, restricted by factors such as power consumption and interference of user equipment (UE), a communication distance of this communication manner is limited. In addition, user equipment outside coverage of a network (for example, a case of partial coverage) cannot establish a connection to the network. As a result, a capability of communication between the user equipment and the network is affected. Therefore, user equipment inside the coverage of the network may be used as first UE, namely, relay user equipment (Relay UE), configured to provide a relay service; and user equipment outside the coverage of the network may be used as second UE, namely, remote user equipment (Remote UE). When the remote user equipment is outside the coverage of the network and is relatively near a coverage area of the network, the remote user equipment may establish a connection to the network by using the relay user equipment.

In a multi-UE coordination technology, when same second UE simultaneously provides a relay service for multiple first UEs, data is transmitted between the multiple first UEs and an evolved base station (eNB) by using the second UE. The transmitted data may include signaling data or service data. The signaling data is a control signal visible to an access network. The service data is data other than the signaling data of data transmitted in a system, and is, for example, data transmitted in a core network or data transmitted on an application layer. The eNB cannot distinguish whether the received data is the signaling data or the service data, and cannot distinguish specific first UE that is a source transmit end of the received data either.

SUMMARY

This specification provides a data transmission method and apparatus, and a related device, so that a network side device can conveniently identify a source transmit end and a data type of data.

According to a first aspect, a data transmission method is provided. The method includes:

adding, by first UE, first radio bearer identifier information (RBID) and/or terminal identifier information of the first UE to data that needs to be sent, where a first radio bearer (RB) corresponding to the first RBID is located between the first UE and a network side device, the first RBID is allocated to the first UE by the network side device, the terminal identifier information is a layer 2 identifier of the first user equipment, the layer 2 identifier is used to instruct an access network to identify the first UE, and the terminal identifier information includes a cell radio network temporary identifier (C-RNTI), an Internet Protocol address (IP address), a temporary identity code (TMSI), or an international mobile subscriber identity (IMSI); and sending, by the first UE, the data to which the first RBID and/or the terminal identifier information is added to the second UE, so that the second UE forwards the data to the network side device.

In this technical solution, a data packet received by the network side device includes the first RBID and the terminal identifier information of the first UE, and the network side device may identify a data type of the data based on the first RBID, and identify a source transmit end of the data based on the terminal identifier information.

In a possible design, the adding, by first UE, the first RBID and/or terminal identifier information of the first UE to data that needs to be sent includes: adding, by the first UE, the first RBID and/or the terminal identifier information of the first UE to a header of a data packet including the data.

In a possible design, the first UE may further receive data of the network side device that is forwarded by the second UE, where the data carries the first RBID, the first user equipment obtains a data type of the data based on the first RBID, the data type includes a service or signaling, and the signaling is used to indicate a control signal visible to the access network.

In this technical solution, a data packet received by the first UE includes the first RBID, and the data type of the data may be identified based on the first RBID.

In a possible design, the sending, by the first UE, the data to which the first RBID and/or the terminal identifier information is added to the second UE, so that the second UE forwards the data to the network side device includes:

sending, by the first UE, the data to which the first RBID and/or the terminal identifier information is added to the second UE by using a pre-established communication connection to the second UE, so that the second UE sends the data to which the first RBID and the terminal identifier information are added to the network side device, where the communication connection includes a D2D connection, a Bluetooth connection, or a WiFi connection.

In this technical solution, data may be transmitted between the first UE and the second UE by using a communication connection such as the D2D connection, the Bluetooth connection, or the WiFi connection, thereby increasing manners of communication between and the first UE and the second UE.

According to a second aspect of the present application, a data transmission method is provided. The method includes:

receiving, by second UE, data sent by first UE, where the data carries a first RBID and/or terminal identifier information of the first UE, a first RB corresponding to the first RBID is located between the first UE and a network side device, the first RBID is allocated to the first UE by the network side device, the terminal identifier information is a layer 2 identifier of the first user equipment, the layer 2 identifier is used to instruct an access network to identify the first UE, and the terminal identifier information includes a C-RNTI, an IP address, a TMSI, or an IMSI;

determining, by the second UE, that the data is data that needs to be forwarded; and sending, by the second UE, the data to the network side device.

In this technical solution, a data packet received by the network side device includes the first RBID and the terminal identifier information of the first UE, and the network side device may identify a data type of the data based on the first RBID, and identify a source transmit end of the data based on the terminal identifier information.

In a possible design, the second UE may further receive data sent by the network side device, where the data carries the first RBID and/or the terminal identifier information of the first UE, the second UE determines that the data is data that needs to be forwarded, and the second UE sends the data to the first UE based on the terminal identifier information.

In this technical solution, a data packet received by the first UE includes the first RBID, and a data type of the data may be identified based on the first RBID.

In a possible design, the determining, by the second UE, that the data is data that needs to be forwarded includes: determining, by the second UE based on the first RBID and/or the terminal identifier information, that the data is the data that needs to be forwarded.

In a possible design, the determining, by the second UE, that the data is data that needs to be forwarded includes:

determining, by the second UE based on a transmission link attribute of the data, that the data is the data that needs to be forwarded, where the transmission link attribute is used to indicate that a transmission link between the first UE and the second UE is in a one-to-one correspondence with the first RB between the first UE and the network side device, and the transmission link attribute includes an identifier indicating whether the data needs to be forwarded.

According to a third aspect of the present application, a data transmission method is provided. The method includes:

receiving, by a network side device, data of first UE that is forwarded by second UE, where the data carries a first RBID and/or terminal identifier information of the first UE, a first RB corresponding to the first RBID is located between the first UE and the network side device, the first RBID is allocated to the first UE by the network side device, the terminal identifier information is a layer 2 identifier of the first user equipment, the layer 2 identifier is used to instruct an access network to identify the first UE, and the terminal identifier information includes a C-RNTI, an IP address, a TMSI, or an IMSI; and determining, by the network side device, a data type of the data based on the first RBID, and determining that a source transmit end of the data is the first UE based on the terminal identifier information, where the data type includes a service or signaling.

In this technical solution, a data packet received by the network side device includes the first RBID and the terminal identifier information of the first UE, and the network side device may identify the data type of the data based on the first RBID, and identify the source transmit end of the data based on the terminal identifier information.

In a possible design, After the receiving, by a network side device, data of first UE that is forwarded by second UE, the method further includes:

processing, by the network side device, the data by using a Packet Data Convergence Protocol (PDCP) processing process corresponding to the first RBID and the terminal identifier information, where the PDCP processing process is in a one-to-one correspondence with the first RBID and the terminal identifier information.

According to a fourth aspect of the present application, a data transmission method is provided. The method includes:

obtaining, by a network side device, a first RBID of data that needs to be sent and/or terminal identifier information of first UE, where a first RB corresponding to the first RBID is located between the first UE and the network side device, the first RBID is allocated to the first UE by the network side device, the terminal identifier information is a layer 2 identifier of the first user equipment, the layer 2 identifier is used to instruct an access network to identify the first UE, and the terminal identifier information includes a C-RNTI, an IP address, a TMSI, or an IMSI;

adding, by the network side device, the first RBID and/or the terminal identifier information to the data; and sending, by the network side device, the data to which the first RBID and/or the terminal identifier information is added to the second UE, so that the second UE forwards the data to the first UE.

In this technical solution, a data packet received by the first UE includes the first RBID, and a data type of the data may be identified based on the first RBID.

According to a fifth aspect of the present application, a data transmission method is provided. The method includes:

receiving, by second UE by using a third RB entity used to communicate with the first UE, data sent by first UE;

obtaining, by the second UE, a first RBID of the data and/or terminal identifier information of the first UE based on a pre-established correspondence between the third RB entity and the first RBID and/or the terminal identifier information, where a first RB corresponding to the first RBID is located between the first UE and a network side device, the first RBID is allocated to the first UE by the network side device, the terminal identifier information is a layer 2 identifier of the first user equipment, the layer 2 identifier is used to instruct an access network to identify the first UE, and the terminal identifier information includes a C-RNTI, an IP address, a TMSI, or an IMSI;

adding, by the second UE, the first RBID and/or the terminal identifier information to the data; and sending, by the second UE, the data to which the first RBID and/or the terminal identifier information is added to the network side device.

In this technical solution, a data packet received by the network side device includes the first RBID and the terminal identifier information of the first UE, and the network side device may identify a data type of the data based on the first RBID, and identify a source transmit end of the data based on the terminal identifier information.

In a possible design, after the obtaining, by the second UE, a first RBID of the data and/or terminal identifier information of the first UE based on a pre-established correspondence between the third RB entity and the first RBID and/or the terminal identifier information, the method further includes:

determining, by the second UE based on the first RBID and/or the terminal identifier information, that the data is data that needs to be forwarded, or determining, by the second UE based on a transmission link attribute of the data, that the data is data that needs to be forwarded.

In a possible design, the adding, by the second UE, the first RBID and/or the terminal identifier information to the data includes: adding, by the second UE, the first RBID and/or the terminal identifier information to the data based on the transmission link attribute of the data.

In a possible design, the receiving, by second UE by using a third RB entity used to communicate with the first UE, data sent by first UE includes:

when a third PDCP entity layer used to communicate with the first UE is configured for the second UE, receiving, on the third PDCP entity layer by the second UE, the data sent by the first UE; and the adding, by the second UE, the first RBID and/or the terminal identifier information to the data includes:

adding, on the third PDCP entity layer by the second UE, the first RBID and/or the terminal identifier information to the data.

In a possible design, the receiving, by second UE by using a third RB entity used to communicate with the first UE, data sent by first UE includes:

when a third PDCP entity layer used to communicate with the first UE is not configured for the second UE, receiving, on a third Radio Link Control (Radio Link Control, RLC) entity layer used to communicate with the first UE, by the second UE, the data sent by the first UE; and the adding, by the second UE, the first RBID and/or the terminal identifier information to the data includes:

adding, on the third RLC entity layer by the second UE, the first RBID and/or the terminal identifier information to the data.

In a possible design, the adding, by the second UE, the first RBID and/or the terminal identifier information to the data includes:

adding, on a fourth PDCP entity layer, a fourth RLC entity layer, or a fourth Media Access Control (Media Access Control, MAC) entity layer used to communicate with the network side device, by the second UE, the first RBID and/or the terminal identifier information to the data.

According to a sixth aspect of the present application, a data transmission method is provided. The method includes:

receiving, by second UE, data sent by a network side device, where the data carries a first RBID and/or terminal identifier information of first UE, a first RB corresponding to the first RBID is located between the first UE and the network side device, the first RBID is allocated to the first UE by the network side device, the terminal identifier information is a layer 2 identifier of the first user equipment, the layer 2 identifier is used to instruct an access network to identify the first UE, and the terminal identifier information includes a C-RNTI, an IP address, a TMSI, or an IMSI;

determining, by the second UE based on the first RBID and/or the terminal identifier information, that the data is data that needs to be forwarded; and sending, by the second UE, the data to the first UE based on the terminal identifier information.

In this technical solution, a data packet received by the first UE includes the first RBID, and a data type of the data may be identified based on the first RBID.

In a possible design, the sending, by the second UE, the data to the first UE based on the terminal identifier information includes:

when a third PDCP entity layer used to communicate with the first UE is configured for the second UE, and the third PDCP entity layer is in a one-to-one correspondence with a first RB entity of the first UE, determining, by the second UE based on the first RBID and/or the terminal identifier information, the third PDCP entity layer corresponding to the first RB entity, and deleting, on the third PDCP entity layer by the second UE, the first RBID and/or the terminal identifier information from the data; and sending, by the second UE, the data from which the first RBID and/or the terminal identifier information is deleted to the first UE by using the third PDCP entity layer.

In a possible design, the sending, by the second UE, the data to the first UE corresponding to the terminal identifier information includes:

when a third PDCP entity layer used to communicate with the first UE is not configured for the second UE, determining, by the second UE based on the first RBID and/or the terminal identifier information, a third RLC entity layer corresponding to a first RB entity, where the third RLC entity layer is used for communication between the second UE and the first UE, and deleting, on the third RLC entity layer by the second UE, the first RBID and/or the terminal identifier information from the data; and sending, by the second UE, the data from which the first RBID and/or the terminal identifier information is deleted to the first UE by using the third RLC entity layer.

According to a seventh aspect of the present application, a data transmission method is provided. The method is applied to a network side device, and the network side device includes a fifth PDCP entity layer communicating with first UE and a second RB entity layer used to communicate with second UE, where the network side device sends, to the second RB entity layer by using the fifth PDCP entity layer, data that needs to be sent, where a first RBID and/or terminal identifier information of first UE are carried, a first RB corresponding to the first RBID is located between the first UE and the network side device, the first RBID is allocated to the first UE by the network side device, the terminal identifier information is a layer 2 identifier of the first user equipment, the layer 2 identifier is used to instruct an access network to identify the first UE, and the terminal identifier information includes a C-RNTI, an IP address, a TMSI, or an IMSI;

the network side device adds, on the second RB entity layer, the first RBID and/or the terminal identifier information to the data; and the network side device sends the data to which the first RBID and/or the terminal identifier information is added to the second UE by using the second RB entity layer.

In a possible design, the network side device may further include a fifth RLC entity layer communicating with the first user equipment, and the sending, by the network side device to the second RB entity layer by using the fifth PDCP entity layer, data that needs to be sent includes:

sending, by the network side device, the data to the second RB entity layer by using the fifth RLC entity layer.

According to an eighth aspect of the present application, a base station is provided. The base station has a function for implementing actions of a base station in the foregoing method designs. The function may be implemented by using hardware, or may be implemented by hardware executing corresponding software. The hardware or software includes one or more modules corresponding to the foregoing function.

In a possible design, A structure of the base station includes a processor and a transmitter. The processor is configured to support the base station to perform a corresponding function in the foregoing methods. The transmitter is configured to support communication between the base station and UE, and send information or an instruction described in the foregoing methods to the UE. The base station may further include a memory. The memory is configured to couple to the processor, and store a necessary program instruction and necessary data of the base station.

According to a ninth aspect of the present application, UE is provided. The UE has a function for implementing actions of the UE in the foregoing method designs. The function may be implemented by using hardware, or may be implemented by hardware executing corresponding software. The hardware or software includes one or more modules corresponding to the foregoing function. The modules may be software and/or hardware.

In a possible design, a structure of the UE includes a receiver and a processor. The receiver is configured to support the UE to receive data sent by a base station and the like. The processor controls the UE to identify a data type based on the data received by the receiver.

According to a tenth aspect of the present application, a data transmission system is provided. The system includes first UE, second UE, and a network side device, where the first UE adds a first RBID and terminal identifier information of the first UE to the data, and sends the data to which the first RBID and the terminal identifier information are added to the second UE, where a first RB corresponding to the first RBID is located between the first UE and a network side device, the first RBID is allocated to the first UE by the network side device, the terminal identifier information is a layer 2 identifier of the first user equipment, the layer 2 identifier is used to instruct an access network to identify the first UE, and the terminal identifier information includes a C-RNTI, an IP address, a TMSI, or an IMSI;

the second UE determines that the data is data that needs to be forwarded, and sends the data to the network side device; and the network side device determines a data type of the data based on the first RBID, and determines that a source transmit end of the data is the first UE based on the terminal identifier information, where the data type includes a service or signaling.

According to an eleventh aspect of the present application, a data transmission system is provided. The system includes first UE, second UE, and a network side device, where the first UE sends, to the second UE by using a first RB entity of the first UE, data that needs to be sent, where the data carries a first RBID, the first RBID is used by the network side device to identify a first RB of the first UE, the first RB corresponding to the first RBID is located between the first UE and the network side device, and the first RBID is allocated to the first UE by the network side device;

the second UE receives, by using a third RB entity used to communicate with the first UE, the data sent by the first UE, obtains terminal identifier information of the first UE based on a pre-established correspondence between the third RB entity and the terminal identifier information of the first UE, adds the terminal identifier information to the data, and sends the data that carries the first RBID and the terminal identifier information to the network side device, where the third RB entity is used for communication between the first UE and the second UE, the terminal identifier information is a layer 2 identifier of the first user equipment, the layer 2 identifier is used to instruct an access network to identify the first UE, and the terminal identifier information includes a C-RNTI, an IP address, a TMSI, or an IMSI; and the network side device determines a data type of the data based on the first RBID, and determines that a source transmit end of the data is the first UE based on the terminal identifier information.

According to a twelfth aspect of the present application, a data transmission system is provided. The system includes first UE, second UE, and a network side device, where the first UE sends, to the second UE by using a first RB entity of the first UE, data that needs to be sent, where the data carries terminal identifier information of the first UE, the terminal identifier information is a layer 2 identifier of the first user equipment, the layer 2 identifier is used to instruct an access network to identify the first UE, and the terminal identifier information includes a C-RNTI, an IP address, a TMSI, or an IMSI;

the second UE receives, by using a third RB entity used to communicate with the first UE, the data sent by the first UE, obtains a first RBID of the data based on a pre-established correspondence between the third RB entity and the first RBID, adds the first RBID to the data, and sends the data that carries the first RBID and the terminal identifier information to the network side device, where the third RB entity is used for communication between the first UE and the second UE, a first RB corresponding to the first RBID is located between the first UE and the network side device, and the first RBID is allocated to the first UE by the network side device; and the network side device determines a data type of the data based on the first RBID, and determines that a source transmit end of the data is the first UE based on the terminal identifier information.

According to a thirteenth aspect of the present application, a data transmission system is provided. The system includes first UE, second UE, and a network side device, where the first UE sends, to the second UE by using a first RB entity of the first UE, data that needs to be sent, where the first RB entity is used to transmit data between the first UE and the network side device;

the second UE receives, by using a third RB entity used to communicate with the first UE, the data sent by the first UE, obtains a first RBID of the data and terminal identifier information of the first UE based on a pre-established correspondence between the third RB entity and the first RBID and the terminal identifier information, adds the first RBID and the terminal identifier information to the data, and sends the data to which the first RBID and the terminal identifier information are added to the network side device, where the third RB entity is used for communication between the first UE and the second UE, a first RB corresponding to the first RBID is located between the first UE and the network side device, the first RBID is allocated to the first UE by the network side device, the terminal identifier information is a layer 2 identifier of the first user equipment, the layer 2 identifier is used to instruct an access network to identify the first UE, and the terminal identifier information includes a C-RNTI, an IP address, a TMSI, or an IMSI; and the network side device determines a data type of the data based on the first RBID, and determines that a source transmit end of the data is the first UE based on the terminal identifier information.

According to a fourteenth aspect of the present application, a computer storage medium is provided. The computer storage medium may store a program, and when the program is executed, some or all steps of the first aspect to the seventh aspect are performed.

BRIEF DESCRIPTION OF DRAWINGS

To describe embodiments of the present application more clearly, the following briefly describes the accompanying drawings required for describing the embodiments. Apparently, the accompanying drawings in the following description show merely some embodiments of the present application, and a person of ordinary skill in the art may still derive other drawings from these accompanying drawings without creative efforts.

DESCRIPTION OF EMBODIMENTS

Figure 1:
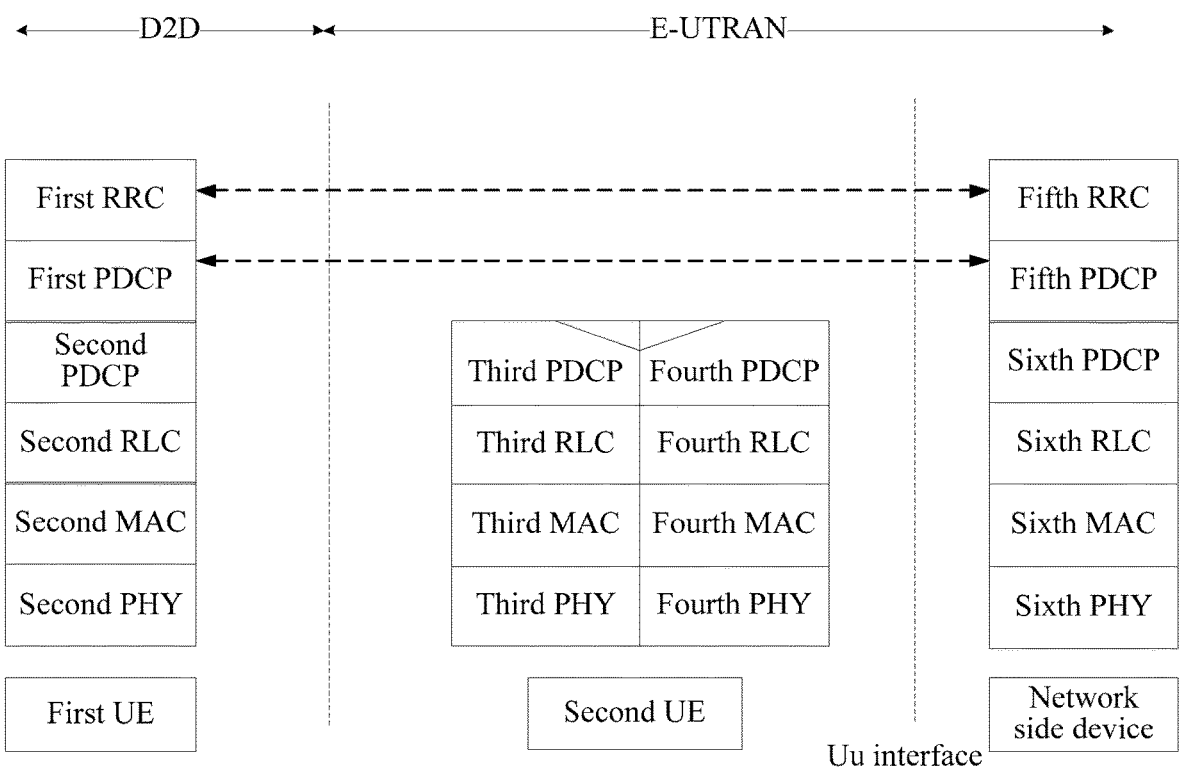
FIG. 1 is a schematic diagram of a protocol stack architecture of a control plane in a data transmission system according to an embodiment of the present application.

FIG. 1 is a schematic diagram of a protocol stack architecture of a control plane in a data transmission system according to an embodiment of the present application. As shown in FIG. 1, the data transmission system may include a first UE, a second UE, and a network side device. Uplink or downlink data transmission is performed between the first UE and the network side device by using the second UE. The first UE may be a wearable device, for example, Google glasses (Google glass), a wristband (for example, a Xiaomi wrist band or a Fibit wrist band), a wristwatch (for example, an Apple watch or a Samsung watch), or Nike shoes. The second UE may be a smartphone, a personal computer (PC), a digital television receiving terminal, an in-vehicle terminal, or the like. The network side device may be an evolved base station or the like. The first UE may communicate with the second UE by using a D2D connection, a Bluetooth connection, a WiFi connection, or the like. The second UE may communicate with the network side device by using a Uu interface. A user plane of the Uu interface is used to transmit service data, and a control plane of the Uu interface is used to transmit signaling. In this embodiment of the present application, an example in which D2D communication is performed between the first UE and the second UE is used for description.

FIG. 1 is a schematic diagram of a protocol stack architecture of a control plane. There is a protocol stack architecture of a Radio Resource Control (RRC) link between the first UE and the network side device. The network side device may manage the first UE, and configure a parameter for the first UE by using the protocol stack architecture.

The first UE may include an RRC layer, a first PDCP layer used to communicate with the network side device, a second PDCP layer used to communicate with the second UE, a second RLC layer used to communicate with the second UE, a second MAC layer used to communicate with the second UE, and a second physical (Physical, PHY) layer used to communicate with the second UE.

The second UE may include a third PDCP layer, a third RLC layer, a third MAC layer, and a third PHY layer used to communicate with the first UE. The second UE may further include a fourth PDCP layer, a fourth RLC layer, a fourth MAC layer, and a fourth PHY layer used to communicate with the network side device.

The network side device may include a fifth RRC layer and a fifth PDCP layer used to communicate with the first UE. The network side device may further include a sixth PDCP layer, a sixth RLC layer, a sixth MAC layer, and a sixth PHY layer used to communicate with the second UE.

The network side device may send signaling to the first UE by using an RRC link established between the network side device and the first UE. The fifth RRC layer of the network side device is used to manage parameter configuration of an access link of the first UE, establish a bearer of the first UE, and configure a security parameter used for data transmission between the first UE and the network side device. The bearer of the first UE may include an access RB and a bearer from the network side device to a core network. A protocol specifies that the core network is a network element, for example, a mobility management entity (MME), a serving gateway (SGW), or a PDN gateway (PGW) that performs a function of core switching or call routing. The PDN (Public Data Network) gateway is a public data network gateway.

In the protocol stack architecture, the network side device manages the first UE by using the fifth RRC layer. The core network keeps unchanged, and compatibility of the core network can be maintained. In addition, for the core network, management of the first UE by the core network is unrelated to whether the second UE is used as a relay. When a communication distance between the first UE and the second UE is relatively large, the first UE may directly link to the network side device by using a Uu interface, and the network side device still keeps a context of the first UE. Therefore, a data transfer capability can be quickly recovered, and a mobility processing procedure is simple and has a small delay.

Figure 2A:
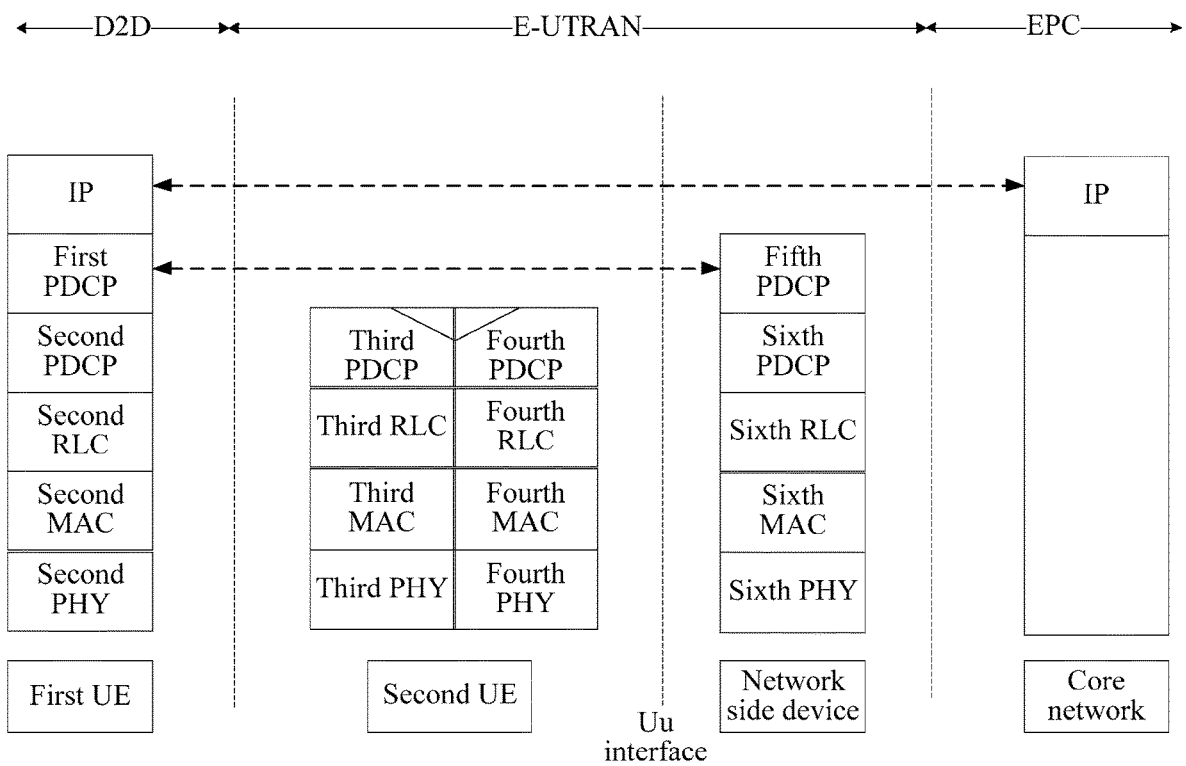
FIG. 2a is a schematic diagram of a protocol stack architecture of a user plane in a data transmission system according to an embodiment of the present application.

FIG. 2a is a schematic diagram of a protocol stack architecture of a user plane in a data transmission system according to an embodiment of the present application. As shown in the figure, the data transmission system may include first UE, second UE, a network side device, and a core network.

The first UE may include an Internet Protocol (IP) layer, a first PDCP layer used to communicate with the network side device, and a second PDCP layer, a second RLC layer, a second MAC layer, and a second PHY layer used to communicate with the second UE.

The second UE may include a third PDCP layer, a third RLC layer, a third MAC layer, and a third PHY layer used to communicate with the first UE. The second UE may further include a fourth PDCP layer, a fourth RLC layer, a fourth MAC layer, and a fourth PHY layer used to communicate with the network side device.

The network side device may include a fifth PDCP layer used to communicate with the first UE. The network side device may further include a sixth PDCP layer, a sixth RLC layer, a sixth MAC layer, and a sixth PHY layer used to communicate with the second UE.

For uplink data transmission, the first UE may perform, on the first PDCP layer used to communicate with the network side device, secure processing on an IP data packet from the IP layer, and then send the processed data packet to the second UE, so that the second UE forwards the processed data packet to the network side device. For downlink data transmission, the network side device may perform, on the fifth PDCP layer used to communicate with the first UE, secure processing on an IP data packet from the core network, and send the processed data packet to the second UE, so that the second UE forwards the processed data packet to the first UE.

In the protocol stack architecture, a parameter of the first UE is directly managed by the network side device. Only the first PDCP layer that is of the first UE and that is used to communicate with the network side device, and the fifth PDCP layer that is of the network side device and that is used to communicate with the first UE participate in data transmission integrity protection and secure processing, and the second UE cannot decrypt the data on which secure processing has been performed, thereby ensuring data transmission security and reliability.

It should be noted that in the protocol stack architecture shown in FIG. 1 or FIG. 2a, the first UE or the second UE may include at least one RB, each RB includes a PDCP processing process, and each PDCP processing process is in a one-to-one correspondence with radio bearer identifier information (RBID) and terminal identifier information. A first RB is located between the first UE and the network side device, and a second RB is located between the second UE and the network side device. The network side device may pre-establish a correspondence between a second RB of the second UE and a first RB of the first UE. One second RB of the second UE may correspond to first RBs of a plurality of first UEs. Optionally, the network side device may establish a data radio bearer (DRB) for each type of quality of service (QoS) data. The DRB is used to transmit data carried by the first RB of the first UE, one DRB of the second UE may correspond to first RBs of a plurality of first UEs, and a type of QoS data carried by the first RB is the same as that of QoS data carried by the DRB.

In a traditional data transmission method, the first RB of the first UE is in a one-to-one correspondence with the second RB of the second UE, and when data is forwarded by the second UE between a plurality of first UEs and the network side device, the network side device needs to configure correspondences between first RBs of different first UEs and different second RBs of the second UE. Therefore, configuration overheads are relatively high. A quantity of the second RBs included by the second UE does not exceed 32. When the same second UE is simultaneously used as a relay of a plurality of first UEs, a quantity of the first UEs that can establish a communication connection to the second UE is limited. When the first RB of the first UE is in a one-to-one correspondence with the second RB of the second UE, the second UE is required to simultaneously support a plurality of PDCP processes. As a result, processing difficulty of the second UE is increased. However, in this embodiment of the present application, one DRB of the second UE corresponds to first RBs of a plurality of first UEs. This can reduce configuration overheads, increase a quantity of first UEs that can be supported by the second UE, and reduce processing difficulty of the second UE.

Figure 3:
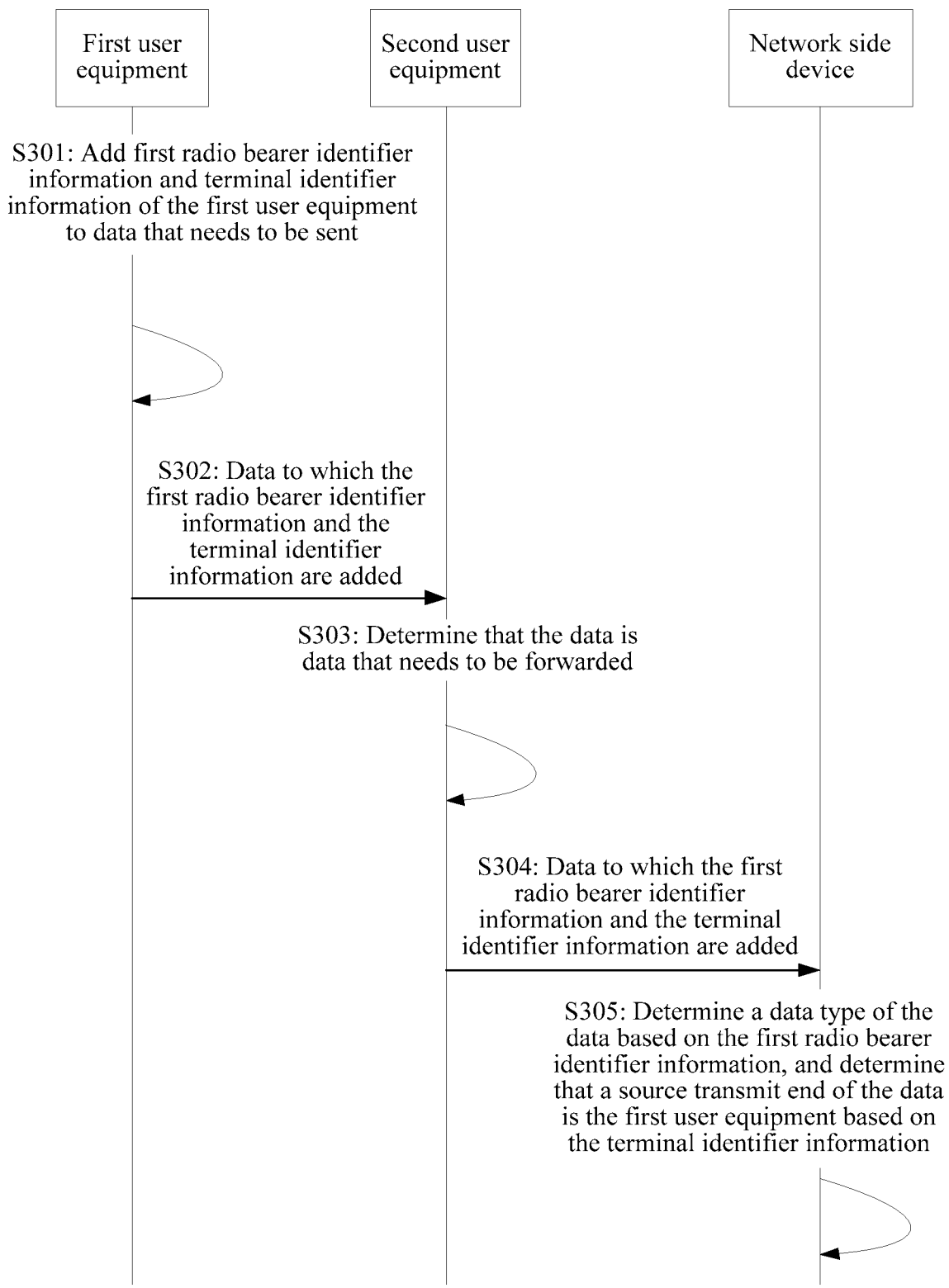
FIG. 3 is a schematic flowchart of a data transmission method according to an embodiment of the present application.

FIG. 3 is a schematic flowchart of a data transmission method according to an embodiment of the present application. In this embodiment of the present application, an application scenario of uplink data transmission is described, where first UE adds a first RBID and terminal identifier information to data that needs to be sent. As shown in FIG. 3, the data transmission method in this embodiment of the present application may include:

Step S301. First user equipment adds first radio bearer identifier information and terminal identifier information of the first user equipment to data that needs to be sent.

When needing to send the data, the first UE may obtain the first RBID of the data and the terminal identifier information of the first UE, and add the first RBID and the terminal identifier information of the first UE to the data that needs to be sent. The first RBID is used to identify a first RB, different RBIDs correspond to different RBs, and the first RB corresponding to the first RBID is located between the first UE and a network side device. The terminal identifier information may be a layer 2 identifier of the first UE, the layer 2 identifier is used to instruct an access network to identify the first UE, and the terminal identifier information may include a C-RNTI, an IP address, a TMSI, an IMSI, or the like.

In an optional embodiment, the first UE may add the first RBID and the terminal identifier information to a header of a data packet including the data. For example, after performing, on a first PDCP layer, secure processing on the data to obtain a protocol data unit (Protocol Data Unit, PDU) data packet, the first UE may add two fields to a header of the PDU data packet, where the fields are used to add the first RBID and the terminal identifier information respectively.

Figure 2B:
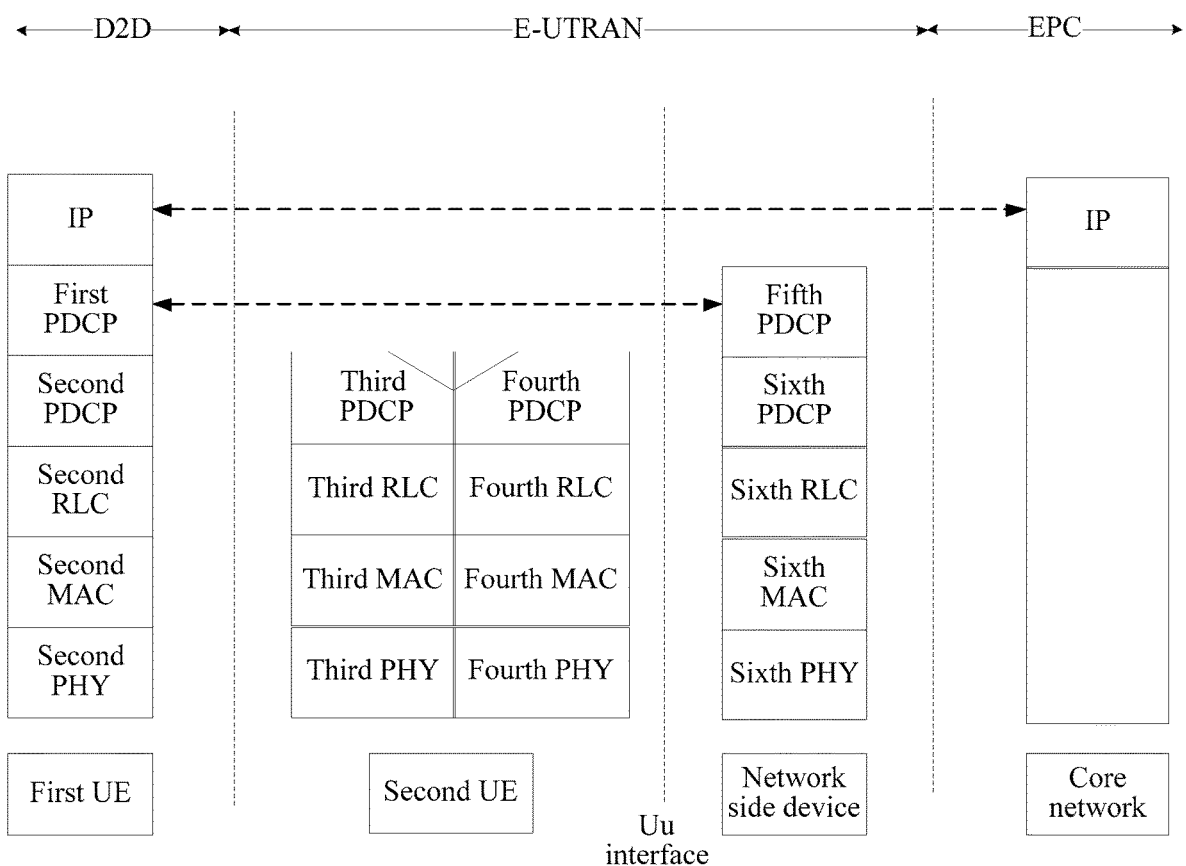
FIG. 2b is a schematic diagram of a protocol stack architecture of a user plane in a data transmission system according to another embodiment of the present application.

In an optional embodiment, the schematic diagram of the protocol stack architecture in the data transmission system shown in FIG. 2b is used as an example. When the first UE includes a first RLC layer used to communicate with the network side device, and the network side device includes a fifth RLC layer used to communicate with the first UE, the first UE may obtain a PDU data packet after performing, on the first PDCP layer, secure processing on the data, transfer the PDU data packet obtained after secure processing to the first RLC layer, and add, on the first RLC layer, two fields to a header of the PDU data packet, where the fields are used to add the first RBID and the terminal identifier information respectively.

Step S302. The first user equipment sends the data to which the first radio bearer identifier information and the terminal identifier information are added to second user equipment.

In a specific implementation, the first UE may send the data to which the first RBID and the terminal identifier information are added to the second UE by using a pre-established communication connection to the second UE. The communication connection may include a D2D connection, a Bluetooth connection, a WiFi connection, or the like.

Step S303. The second user equipment determines that the data is data that needs to be forwarded.

After receiving the data sent by the first UE, the second UE may determine whether the data is the data that needs to be forwarded. When the data is the data that needs to be forwarded, the second UE may send the data to the network side device. When the data is not the data that needs to be forwarded, the second UE may directly process the data.

In an optional embodiment, the second UE may determine, based on the first RBID and/or the terminal identifier information, that the data is the data that needs to be forwarded. Specifically, if the first UE intends to send the data to only the second UE, the first UE may not add the first RBID and the terminal identifier information, and directly send the data to the second UE. The data received by the second UE does not include the first RBID or the terminal identifier information. If the first UE intends to send the data to the second UE, so that the second UE forwards the data to the network side device, the first UE may add the first RBID and the terminal identifier information, and send the data to which the first RBID and the terminal identifier information are added to the second UE. The data received by the second UE includes the first RBID and the terminal identifier information. In other words, the second UE may determine whether the received data includes the first RBID or the terminal identifier information, and when the received data includes the first RBID or the terminal identifier information, the second UE may determine that the data is the data that needs to be forwarded.

In an optional embodiment, the second UE may determine, based on a transmission link attribute of the data, that the data is the data that needs to be forwarded. The transmission link attribute is used to indicate that a transmission link between the first UE and the second UE is in a one-to-one correspondence with a first RB between the first UE and the network side device. The transmission link attribute may include an identifier indicting whether the data needs to be forwarded. Optionally, the transmission link attribute may further include: an identifier of a user served by the transmission link or an RBID of a user served by the transmission link.

Step S304. The second user equipment sends the data to which the first radio bearer identifier information and the terminal identifier information are added to a network side device.

In a specific implementation, after determining that the data is the data that needs to be forwarded, the second UE may not process the data, and directly send the received data to the network side device by using a network connection.

Step S305. The network side device determines a data type of the data based on the first RBID, and determines that a source transmit end of the data is the first user equipment based on the terminal identifier information.

In a specific implementation, when receiving the data to which the first RBID and the terminal identifier information are added, the network side device may determine the data type of the data based on the first RBID, for example, the network side device may identify whether the received data is service data, signaling data, or the like based on the first RBID. The network side device may further determine that the source transmit end of the data is the first UE based on the terminal identifier information.

In an optional embodiment, after receiving the data sent by the second UE, the network side device may process the data by using a PDCP processing process corresponding to the first RBID and the terminal identifier information. The PDCP processing process is in a one-to-one correspondence with the first RBID and the terminal identifier information. Specifically, when the first RBID and the terminal identifier information in the received data match none of PDCP processing processes of the network side device, the network side device may delete the data. When the first RBID and the terminal identifier information in the received data match a PDCP processing process of the network side device, the network side device may process the data by using the PDCP processing process.

In the embodiment shown in FIG. 3, the first UE adds the first RBID and the terminal identifier information of the first UE to the data that needs to be sent, and sends the data to which the first RBID and the terminal identifier information are added to the second user equipment, so that the second user equipment sends the data to the network side device, and the network side device conveniently identifies the source transmit end and the data type of the received data.

Figure 4:
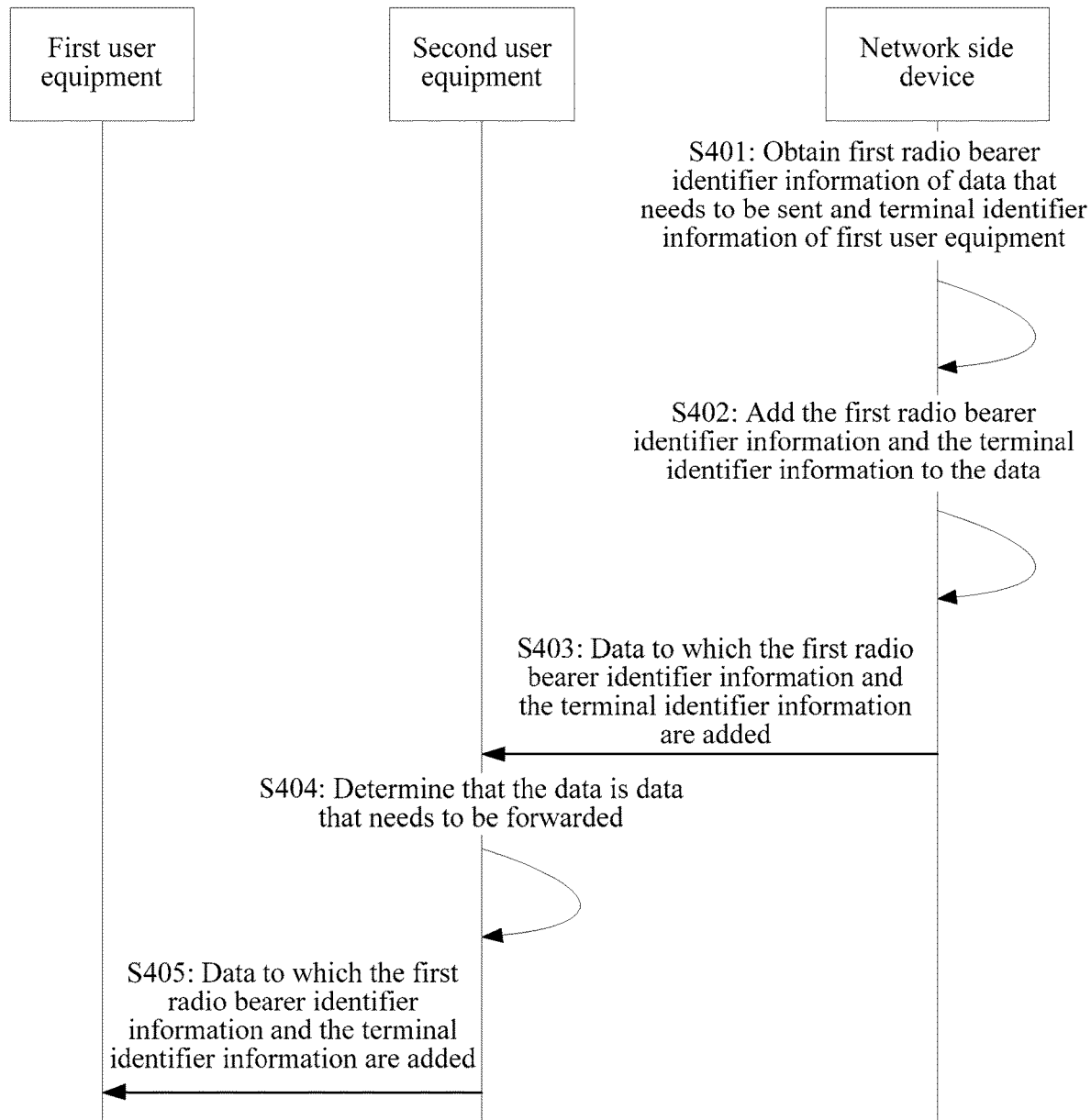
FIG. 4 is a schematic flowchart of a data transmission method according to another embodiment of the present application.

FIG. 4 is a schematic flowchart of a data transmission method according to another embodiment of the present application. In this embodiment of the present application, an application scenario of downlink data transmission is described, where a network side device adds a first RBID and terminal identifier information to data that needs to be sent. As shown in FIG. 4, the data transmission method in this embodiment of the present application may include:

Step S401. A network side device obtains first radio bearer identifier information of data that needs to be sent and terminal identifier information of first user equipment.

The network side device may locally obtain the first RBID of the data that needs to be sent and the terminal identifier information of the first UE. For example, in response to data of the first UE that is forwarded by second UE, the network side device may obtain the data that needs to be sent to the first UE, and obtain the first RBID of the data and the terminal identifier information of the first UE. For another example, the network side device may push information to the first UE. The pushed information may be the data that currently needs to be sent. The network side device may locally obtain the first RBID of the data that needs to be sent and the terminal identifier information of the first UE.

Step S402. The network side device adds the first radio bearer identifier information and the terminal identifier information to the data.

In an optional embodiment, the network side device may add the first RBID and the terminal identifier information to a header of a data packet including the data that needs to be sent. For example, after performing, on a fifth PDCP layer used to communicate with the first UE, secure processing on the data to obtain a PDU data packet, the network side device may add two fields to a header of the PDU data packet, where the fields are used to add the first RBID and the terminal identifier information respectively. For another example, the network side device obtains a PDU data packet after performing secure processing on the fifth PDCP layer used to communicate with the first UE, transfers the PDU data packet obtained after secure processing to a fifth RLC layer used to communicate with the first UE, and adds, on the fifth RLC layer, two fields to a header of the PDU data packet, where the fields are used to add the first RBID and the terminal identifier information respectively.

Step S403. The network side device sends the data to which the first radio bearer identifier information and the terminal identifier information are added to second user equipment.

Step S404. The second user equipment determines that the data is data that needs to be forwarded.

After receiving the data sent by the network side device, the second UE may determine whether the data is the data that needs to be forwarded. When the data is the data that needs to be forwarded, the second UE may send the data to the first UE corresponding to the terminal identifier information. When the data is not the data that needs to be forwarded, the second UE may directly process the data.

In an optional embodiment, the second UE may determine, based on the first RBID and/or the terminal identifier information, that the data is the data that needs to be forwarded. Specifically, if the network side device intends to send the data to only the second UE, the network side device may not add the first RBID and the terminal identifier information, and directly send the data to the second UE. The data received by the second UE does not include the first RBID or the terminal identifier information. If the network side device intends to send the data to the second UE, so that the second UE forwards the data to the first UE, the network side device may add the first RBID and the terminal identifier information, and send the data to which the first RBID and the terminal identifier information are added to the second UE. The data received by the second UE includes the first RBID and the terminal identifier information. In other words, the second UE may determine whether the received data includes the first RBID or the terminal identifier information, and when the received data includes the first RBID or the terminal identifier information, the second UE may determine that the data is the data that needs to be forwarded.

In an optional embodiment, when the second UE obtains the data packet from a second RB configured on a network side, the second UE may determine that the data is the data that needs to be forwarded. The second RB is located between the second UE and the network side device, and the second RB is used to transmit one or more pieces of data whose source transmit end or destination transmit end is the first UE.

Step S405. The second user equipment sends the data to which the first radio bearer identifier information and the terminal identifier information are added to the first user equipment.

In an optional embodiment, after determining that the data is the data that needs to be forwarded, the second UE may delete the terminal identifier information from the data, and send the data from which the terminal identifier information is deleted to the first UE based on the terminal identifier information. The first UE may identify a data type of the data based on the first RBID.

In an optional embodiment, after the second UE determines that the data is the data that needs to be forwarded, when a communication link between the second UE and the first UE is in a one-to-one correspondence with the first RB of the first UE, the second UE may delete the first RBID and the terminal identifier information from the data, and send the data from which the first RBID and the terminal identifier information are deleted to the first UE based on the terminal identifier information.

In the embodiment shown in FIG. 4, the network side device obtains the first RBID of the data that needs to be transmitted and the terminal identifier information of the first UE, adds the first RBID and the terminal identifier information to the data, and sends the data to which the first RBID and the terminal identifier information are added to the second user equipment, so that the second user equipment forwards the data to the first user equipment, so that the first UE conveniently identifies the data type of the data.

Figure 5:
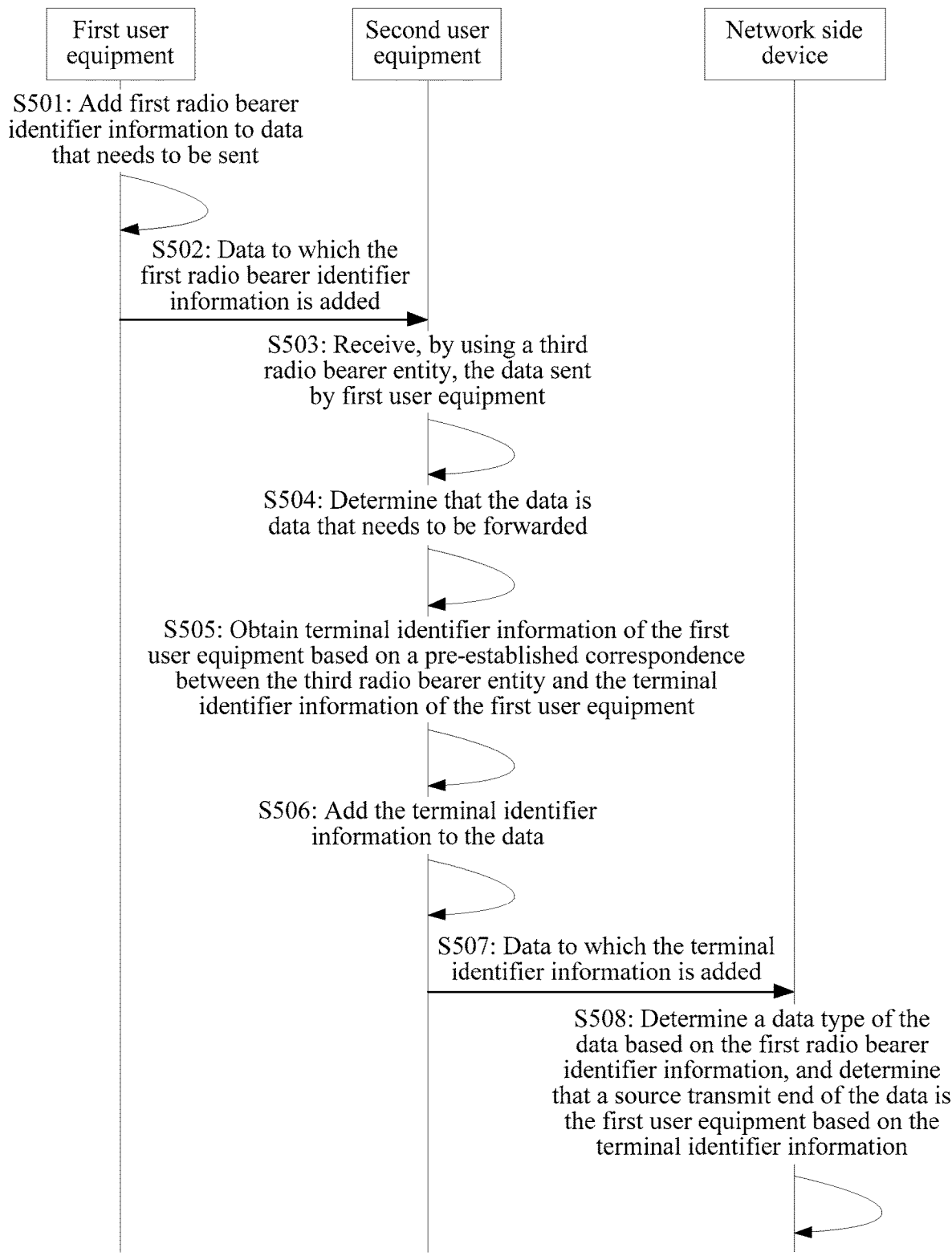
FIG. 5 is a schematic flowchart of a data transmission method according to another embodiment of the present application.

FIG. 5 is a schematic flowchart of a data transmission method according to another embodiment of the present application. In this embodiment of the present application, an application scenario of uplink data transmission is described, where first UE adds a first RBID to data that needs to be sent, and second UE adds terminal identifier information of the first UE to the data to which the first RBID is added. As shown in FIG. 5, the data transmission method in this embodiment of the present application may include:

Step S501. First user equipment adds first radio bearer identifier information to data that needs to be sent.

When needing to send the data, the first UE may obtain the first RBID of the data, and add the first RBID to the data that needs to be sent.

In an optional embodiment, the first UE may add the first RBID to a header of a data packet including the data. For example, after performing, on a first PDCP layer, secure processing on the data to obtain a PDU data packet, the first UE may add one field to a header of the PDU data packet, where the field is used to add the first RBID. For another example, the first UE obtains a PDU data packet after performing, on the first PDCP layer, secure processing on the data, transfers the PDU data packet obtained after secure processing to a first RLC layer, and adds, on the first RLC layer, two fields to a header of the PDU data packet, where the fields are used to add the first RBID and the terminal identifier information respectively.

Step S502. The first user equipment sends the data to which the first radio bearer identifier information is added to second user equipment.

Step S503. The second user equipment receives, by using a third radio bearer entity, the data sent by the first user equipment.

The second UE may receive, by using the third RB entity used to communicate with the first UE, the data sent by the first UE. The second UE may include a third PDCP layer used to communicate with the first UE, the third PDCP layer includes at least one PDCP processing process, each PDCP processing process corresponds to a third RB entity, and the third RB entity is used for communication between the second UE and the first UE. In this embodiment of the present application, the network side device configures that a first RB of the first UE is in a one-to-one correspondence with a third RB of the second UE, and the second UE may pre-establish a correspondence between the third RB and the terminal identifier information of the first UE.

In an optional embodiment, when a third PDCP entity layer used to communicate with the first UE is configured for the second UE, the second UE receives, on the third PDCP entity layer, the data sent by the first UE.

In an optional embodiment, when a third PDCP layer used to communicate with the first UE is not configured for the second UE, the second UE receives, on a third RLC entity layer, the data sent by the first UE.

Step S504. The second user equipment determines that the data is data that needs to be forwarded.

After receiving the data sent by the first UE, the second UE may determine whether the data is the data that needs to be forwarded. When the data is the data that needs to be forwarded, the second UE may send the data to the network side device. When the data is not the data that needs to be forwarded, the second UE may directly process the data.

In an optional embodiment, the second UE may determine, based on the first RBID, that the data is the data that needs to be forwarded. Specifically, if the first UE intends to send the data to only the second UE, the first UE may not add the first RBID, and directly send the data to the second UE. The data received by the second UE does not include the first RBID. If the first UE intends to send the data to the second UE, so that the second UE forwards the data to the network side device, the first UE may add the first RBID, and send the data to which the first RBID is added to the second UE. The data received by the second UE includes the first RBID. In other words, the second UE may determine whether the received data includes the first RBID, and when the received data includes the first RBID, the second UE may determine that the data is the data that needs to be forwarded.

In an optional embodiment, the second UE may determine, based on a transmission link attribute of the data, that the data is the data that needs to be forwarded. The transmission link attribute is used to indicate that a transmission link between the first UE and the second UE is in a one-to-one correspondence with a first RB between the first UE and the network side device. The transmission link attribute may include an identifier indicting whether the data needs to be forwarded. Optionally, the transmission link attribute may further include: an identifier of a user served by the transmission link or an RBID of a user served by the transmission link.

Step S505. The second user equipment obtains terminal identifier information of the first user equipment based on a pre-established correspondence between the third radio bearer entity and the terminal identifier information of the first user equipment.

Step S506. The second user equipment adds the terminal identifier information to the data.

In an optional embodiment, the second UE may add the terminal identifier information to the data based on the transmission link attribute of the data.

In an optional embodiment, after receiving, on the third PDCP entity layer, the data sent by the first UE, the second UE may add, on the third PDCP entity layer, the terminal identifier information to the data.

In an optional embodiment, after receiving, on the third RLC entity layer, the data sent by the first UE, the second UE may add, on the third RLC entity layer, the terminal identifier information to the data.

In an optional embodiment, the second UE may add, on a fourth PDCP entity layer, a fourth RLC entity layer, or a fourth MAC entity layer used to communicate with the network side device, the terminal identifier information to the data.

It should be noted that the second UE adds, on layers including but not limited to the foregoing entity layers, the terminal identifier information to the data. For example, the second UE may add, on an adaptation layer, the terminal identifier information to the data. Specifics are not limited in this embodiment of the present application.

Step S507. The second user equipment sends the data to which the terminal identifier information is added to a network side device.

Step S508. The network side device determines a data type of the data based on the first RBID, and determines that a source transmit end of the data is the first user equipment based on the terminal identifier information.

In the embodiment shown in FIG. 5, the first UE adds the first RBID to the data that needs to be sent, and sends the data to which the first RBID is added to the second UE, and the second UE receives, by using the third RB entity, the data sent by the first UE, obtains the terminal identifier information of the first UE based on the pre-established correspondence between the third RB entity and the terminal identifier information of the first UE, adds the terminal identifier information to the data, and sends the data to which the terminal identifier information is added to the network side device, so that the network side device conveniently identifies the source transmit end and the data type of the received data.

Figure 6:
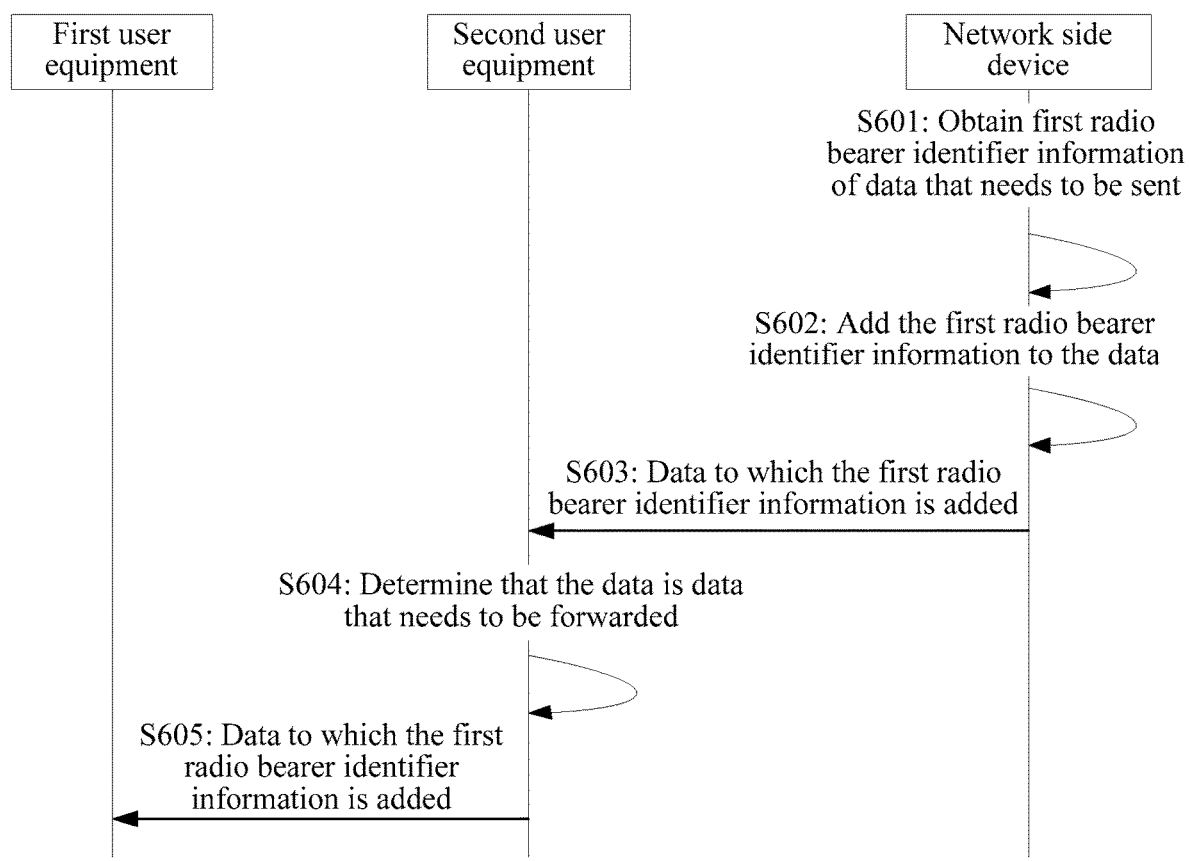
FIG. 6 is a schematic flowchart of a data transmission method according to another embodiment of the present application.

FIG. 6 is a schematic flowchart of a data transmission method according to another embodiment of the present application. In this embodiment of the present application, an application scenario of downlink data transmission is described, where a network side device adds a first RBID to data that needs to be sent, and second UE sends the data to which the first RBID is added to first UE. As shown in FIG. 6, the data transmission method in this embodiment of the present application may include:

Step S601. A network side device obtains first radio bearer identifier information of data that needs to be transmitted.

Step S602. The network side device adds the first radio bearer identifier information to the data.

In an optional embodiment, the network side device may include a fifth PDCP entity layer communicating with the first UE and a second RB entity layer used to communicate with second UE. The network side device sends, to the second RB entity layer by using the fifth PDCP entity layer, the data that needs to be sent, where the first RBID is carried, and the network side device adds, on the second RB entity layer, the first RBID to the data.

In an optional embodiment, the network side device may further include a fifth RLC entity layer communicating with the first UE, and the network side device may send, to the second RB entity layer by using the fifth RLC entity layer, the data that needs to be sent.

Step S603. The network side device sends the data to which the first radio bearer identifier information is added to second user equipment.

After adding, on the second RB entity layer, the first RBID to the data, the network side device may send the data to which the first RBID is added to the second UE by using the second RB entity layer.

Step S604. The second user equipment determines that the data is data that needs to be forwarded.

After receiving the data sent by the network side device, the second UE may determine whether the data is the data that needs to be forwarded. When the data is the data that needs to be forwarded, the second UE may send the data to the first UE corresponding to the terminal identifier information. When the data is not the data that needs to be forwarded, the second UE may directly process the data.

In an optional embodiment, the second UE may determine, based on the first RBID, that the data is the data that needs to be forwarded. Specifically, if the network side device intends to send the data to only the second UE, the network side device may not add the first RBID, and directly send the data to the second UE. The data received by the second UE does not include the first RBID. If the network side device intends to send the data to the second UE, so that the second UE forwards the data to the first UE, the network side device may add the first RBID, and send the data to which the first RBID is added to the second UE. The data packet received by the second UE includes the first RBID. In other words, the second UE may determine whether the received data includes the first RBID, and when the received data includes the first RBID, the second UE may determine that the data is the data that needs to be forwarded.

In an optional embodiment, when the second UE obtains the data packet from a second RB configured on a network side, the second UE may determine that the data is the data that needs to be forwarded. The second RB is located between the second UE and the network side device, and the second RB is used to transmit one or more pieces of data whose source transmit end or destination transmit end is the first UE.

Step S605. The second user equipment sends the data to which the first radio bearer identifier information is added to first user equipment.

In this embodiment of the present application, if the network side device configures that the second UE is used as a relay of only the first UE, after determining that the data is the data that needs to be forwarded, the second UE may directly send the data to which the first RBID is added to the first UE.

In an optional embodiment, when a third PDCP entity layer used to communicate with the first UE is configured for the second UE, and the third PDCP entity layer is in a one-to-one correspondence with a first RB entity of the first UE, the second UE may determine, based on the first RBID, the third PDCP entity layer corresponding to the first RB entity, delete, on the third PDCP entity layer, the first RBID from the data, and send the data from which the first RBID is deleted to the first UE by using the third PDCP entity layer.

When the third PDCP entity layer used to communicate with the first UE is not configured for the second UE, the second UE determines, based on the first RBID, the third RLC entity layer corresponding to the first RB entity, deletes, on the third RLC entity layer, the first RBID from the data, and sends the data from which the first RBID is deleted to the first UE by using the third RLC entity layer.

In the embodiment shown in FIG. 6, the network side device obtains the first RBID of the data that needs to be transmitted, adds the first RBID to the data, and sends the data to which the first RBID is added to the second UE, and the second UE sends the data to which the first RBID is added to the first UE, so that the first UE conveniently identifies the data type of the received data.

Figure 7:
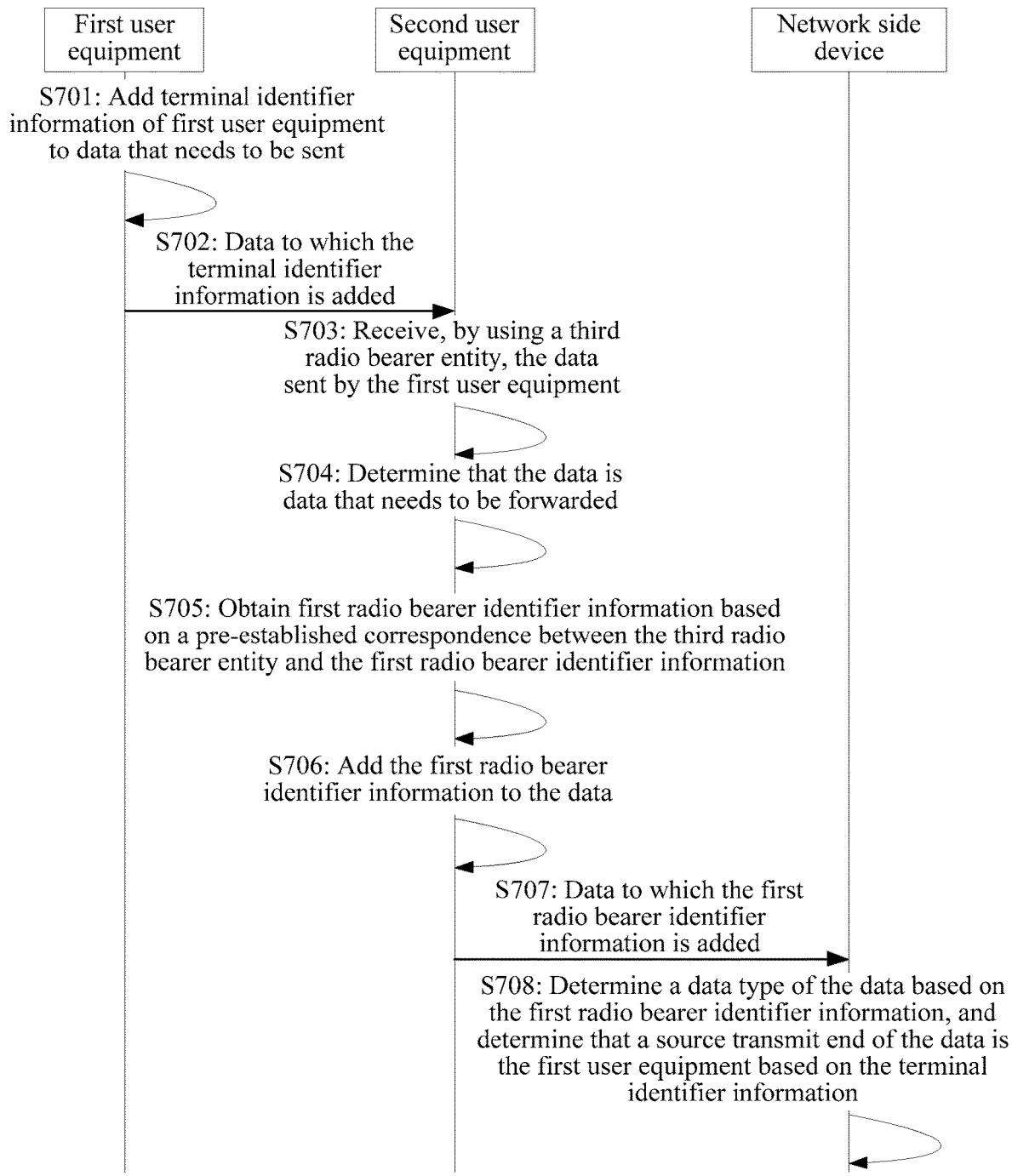
FIG. 7 is a schematic flowchart of a data transmission method according to another embodiment of the present application.

FIG. 7 is a schematic flowchart of a data transmission method according to another embodiment of the present application. In this embodiment of the present application, an application scenario of uplink data transmission is described, where first UE adds terminal identifier information of the first UE to data that needs to be sent, and second UE adds a first RBID to the data to which the terminal identifier information of the first UE is added. As shown in FIG. 7, the data transmission method in this embodiment of the present application may include:

Step S701. First user equipment adds terminal identifier information of the first user equipment to data that needs to be sent.

When needing to send the data, the first UE may obtain the terminal identifier information of the first UE, and add the terminal identifier information of the first UE to the data that needs to be sent.

In an optional embodiment, the first UE may add the terminal identifier information of the first UE to a header of a data packet including the data. For example, after performing, on a first PDCP layer, secure processing on the data to obtain a PDU data packet, the first UE may add one field to a header of the PDU data packet, where the field is used to add the terminal identifier information of the first UE. For another example, after obtaining a PDU data packet by performing, on the first PDCP layer, secure processing on the data, the first UE may transfer the PDU data packet obtained after secure processing to a first RLC layer, and add, on the first RLC layer, two fields to a header of the PDU data packet, where the fields are used to add the first RBID and the terminal identifier information respectively.

Step S702. The first user equipment sends the data to which the terminal identifier information is added to second user equipment.

Step S703. The second user equipment receives, by using a third radio bearer entity, the data sent by the first user equipment.

The second UE may receive, by using the third RB entity used to communicate with the first UE, the data sent by the first UE. The second UE may include a third PDCP layer used to communicate with the first UE, the third PDCP layer includes at least one PDCP processing process, each PDCP processing process corresponds to a third RB entity, and the third RB entity is used for communication between the second UE and the first UE. In this embodiment of the present application, the network side device configures that a first RB of the first UE is in a one-to-one correspondence with a third RB of the second UE, and the second UE may pre-establish a correspondence between the third RB and the first RBID.

In an optional embodiment, when a third PDCP entity layer used to communicate with the first UE is configured for the second UE, the second UE receives, on the third PDCP entity layer, the data sent by the first UE.

In an optional embodiment, when a third PDCP layer is not configured for the second UE, the second UE receives, on a third RLC entity layer used to communicate with the first UE, the data sent by the first UE.

Step S704. The second user equipment determines that the data is data that needs to be forwarded.

After receiving the data sent by the first UE, the second UE may determine whether the data is the data that needs to be forwarded. When the data is the data that needs to be forwarded, the second UE may send the data to the network side device. When the data is not the data that needs to be forwarded, the second UE may directly process the data.

In an optional embodiment, the second UE may determine, based on the first RBID, that the data is the data that needs to be forwarded. Specifically, if the first UE intends to send the data to only the second UE, the first UE may not add the terminal identifier information, and directly send the data to the second UE. The data received by the second UE does not include the terminal identifier information. If the first UE intends to send the data to the second UE, so that the second UE forwards the data to the network side device, the first UE may add the terminal identifier information of the first UE, and send the data to which the terminal identifier information is added to the second UE. The data received by the second UE includes the terminal identifier information. In other words, the second UE may determine whether the received data includes the terminal identifier information, and when the received data includes the terminal identifier information, the second UE may determine that the data is the data that needs to be forwarded.

In an optional embodiment, the second UE may determine, based on a transmission link attribute of the data, that the data is the data that needs to be forwarded. The transmission link attribute is used to indicate that a transmission link between the first UE and the second UE is in a one-to-one correspondence with a first RB between the first UE and the network side device. The transmission link attribute may include an identifier indicting whether the data needs to be forwarded. Optionally, the transmission link attribute may further include: an identifier of a user served by the transmission link or an RBID of a user served by the transmission link.

Step S705. The second user equipment obtains first radio bearer identifier information based on a pre-established correspondence between the third radio bearer entity and the first radio bearer identifier information.

Step S706. The second user equipment adds the first radio bearer identifier information to the data.

In an optional embodiment, the second UE may add the first RBID to the data based on the transmission link attribute of the data.

In an optional embodiment, after receiving, on the third PDCP entity layer, the data sent by the first UE, the second UE may add, on the third PDCP entity layer, the first RBID to the data.

In an optional embodiment, after receiving, on the third RLC entity layer, the data sent by the first UE, the second UE may add, on the third RLC entity layer, the first RBID to the data.

In an optional embodiment, the second UE may add, on a fourth PDCP entity layer, a fourth RLC entity layer, or a fourth MAC entity layer used to communicate with the network side device, the first RBID to the data.

It should be noted that the second UE adds, on layers including but not limited to the foregoing entity layers, the terminal identifier information to the data. For example, the second UE may add, on an adaptation layer, the terminal identifier information to the data. Specifics are not limited in this embodiment of the present application.

Step S707. The second user equipment sends the data to which the first radio bearer identifier information is added to a network side device.

Step S708. The network side device determines a data type of the data based on the first RBID, and determines that a source transmit end of the data is the first user equipment based on the terminal identifier information.

In the embodiment shown in FIG. 7, the first UE adds the terminal identifier information of the first UE to the data that needs to be sent, and sends the data to which the terminal identifier information is added to the second UE, and the second UE receives, by using the third RB entity, the data sent by the first UE, obtains the first RBID based on the pre-established correspondence between the third RB entity and the first RBID, adds the first RBID to the data, and sends the data to which the first RBID is added to the network side device.

Figure 8:
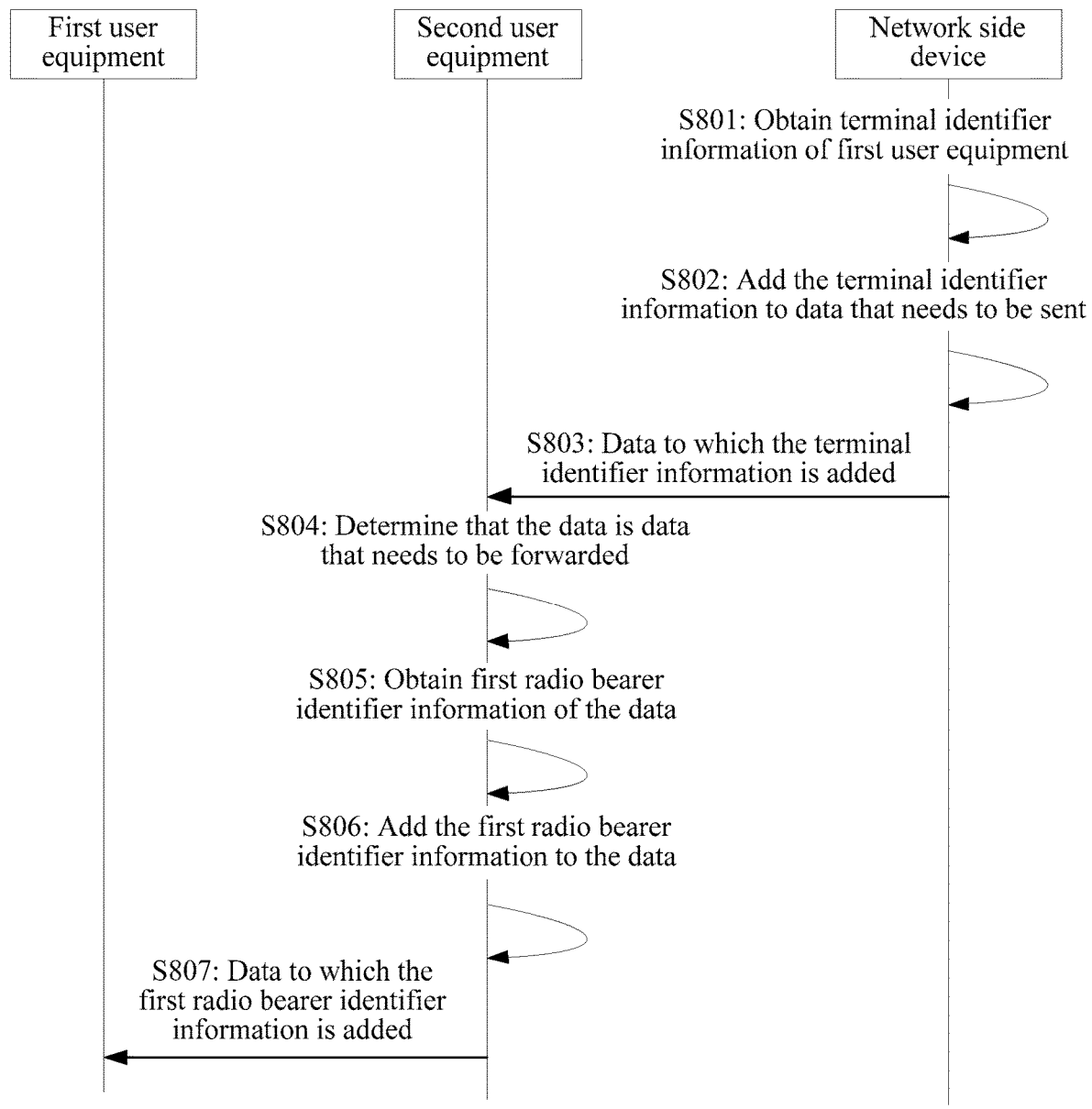
FIG. 8 is a schematic flowchart of a data transmission method according to another embodiment of the present application.

FIG. 8 is a schematic flowchart of a data transmission method according to another embodiment of the present application. In this embodiment of the present application, an application scenario of downlink data transmission is described, where a network side device adds terminal identifier information of first UE to data that needs to be sent, and second UE adds a first RBID to the data to which the terminal identifier information of the first UE is added. As shown in FIG. 8, the data transmission method in this embodiment of the present application may include:

Step S801. A network side device obtains terminal identifier information of first user equipment.

Step S802. The network side device adds the terminal identifier information to data that needs to be sent.

In an optional embodiment, the network side device may include a fifth PDCP entity layer communicating with the first UE and a second RB entity layer used to communicate with second UE. The network side device sends, to the second RB entity layer by using the fifth PDCP entity layer, the data that needs to be sent, where the terminal identifier information of the first UE is carried, and the network side device adds, on the second RB entity layer, the terminal identifier information of the first UE to the data.

In an optional embodiment, the network side device may further include a fifth RLC entity layer communicating with the first UE, and the network side device may send, to the second RB entity layer by using the fifth RLC entity layer, the data that needs to be sent.

Step S803. The network side device sends the data to which the terminal identifier information is added to second user equipment.

After adding, on the second RB entity layer, the terminal identifier information of the first UE to the data, the network side device may send the data to which the terminal identifier information of the first UE is added to the second UE by using the second RB entity layer.

Step S804. The second user equipment determines that the data is data that needs to be forwarded.

After receiving the data sent by the network side device, the second UE may determine whether the data is the data that needs to be forwarded. When the data is the data that needs to be forwarded, the second UE may send the data to the first UE corresponding to the terminal identifier information. When the data is not the data that needs to be forwarded, the second UE may directly process the data.

In an optional embodiment, the second UE may determine, based on the terminal identifier information, that the data is the data that needs to be forwarded. Specifically, if the network side device intends to send the data to only the second UE, the network side device may not add the terminal identifier information, and directly send the data to the second UE. The data received by the second UE does not include the terminal identifier information. If the network side device intends to send the data to the second UE, so that the second UE forwards the data to the first UE, the network side device may add the terminal identifier information of the first UE, and send the data to which the terminal identifier information of the first UE is added to the second UE. The data received by the second UE includes the terminal identifier information. In other words, the second UE may determine whether the received data includes the terminal identifier information, and when the received data includes the terminal identifier information, the second UE may determine that the data is the data that needs to be forwarded.

In an optional embodiment, when the second UE obtains the data packet from a second RB configured on a network side, the second UE may determine that the data is the data that needs to be forwarded. The second RB is located between the second UE and the network side device, and the second RB is used to transmit one or more pieces of data whose source transmit end or destination receive end is the first UE.

Step S805. The second user equipment obtains first radio bearer identifier information of the data.

In this embodiment of the present application, if the network side device configures that the second UE is used as a relay of only the first UE, the second UE may obtain the locally stored first RBID of the data.

Step S806. The second user equipment adds the first radio bearer identifier information to the data.

Step S807. The second user equipment sends the data to which the first radio bearer identifier information is added to the first user equipment.

In an optional embodiment, when a third PDCP entity layer used to communicate with the first UE is configured for the second UE, and the third PDCP entity layer is in a one-to-one correspondence with a first RB entity of the first UE, the second UE may determine, based on the first RBID, the third PDCP entity layer corresponding to the first RB entity, delete, on the third PDCP entity layer, the first RBID and the terminal identifier information from the data, and send the data from which the first RBID and the terminal identifier information are deleted to the first UE by using the third PDCP entity layer.

When the third PDCP entity layer is not configured for the second UE, the second UE determines, based on the first RBID, the third RLC entity layer corresponding to the first RB entity, deletes, on the third RLC entity layer, the first RBID and the terminal identifier information from the data, and sends the data from which the first RBID and the terminal identifier information are deleted to the first UE by using the third RLC entity layer.

In the embodiment shown in FIG. 8, the network side device obtains the terminal identifier information of the first UE, adds the terminal identifier information to the data, and sends the data to which the terminal identifier information is added to the second UE, and the second UE obtains the first RBID, adds the first RBID to the data, and sends the data to which the first RBID is added to the first UE, so that the first UE conveniently identifies the data type of the received data.

Figure 9:
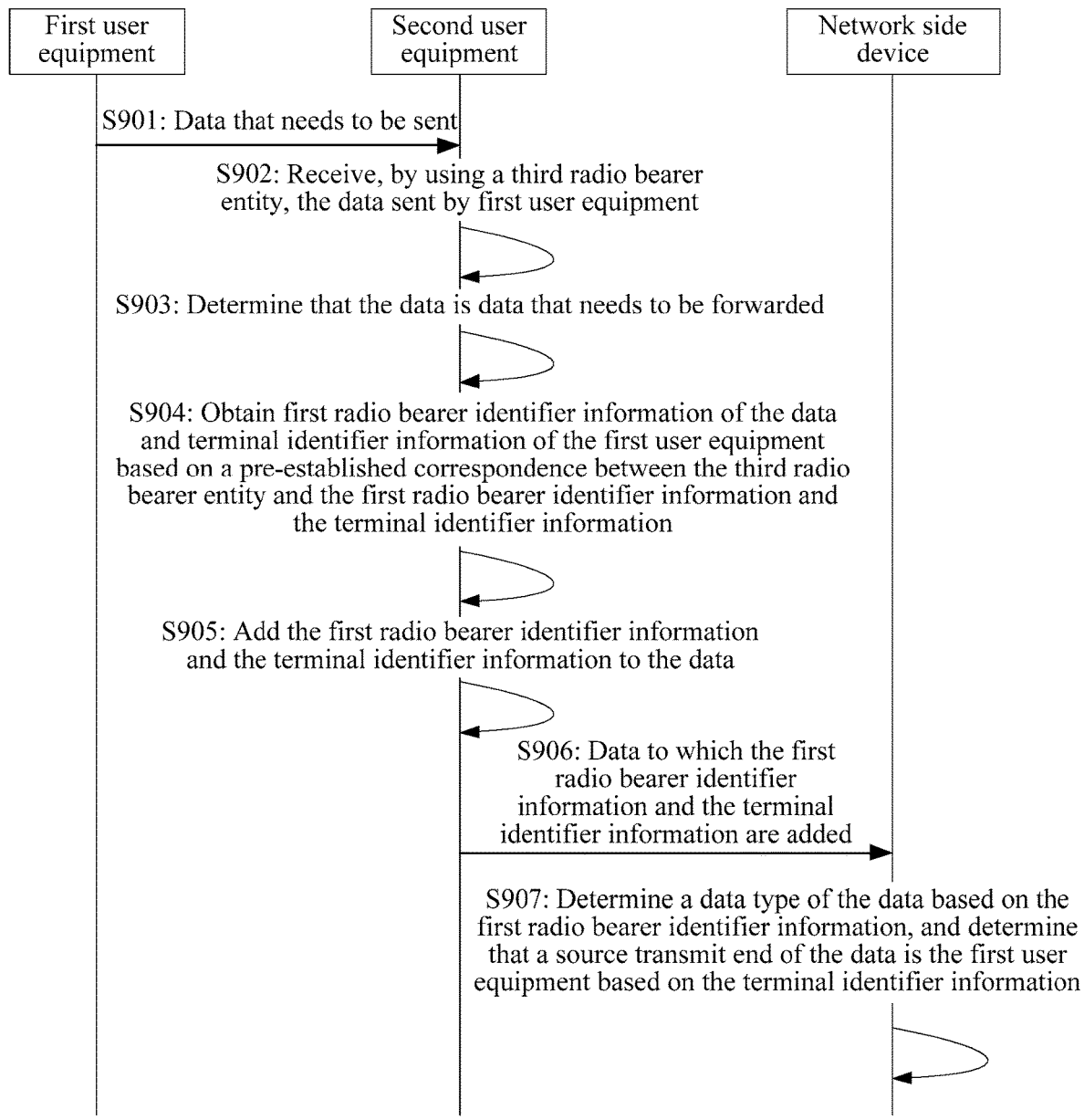
FIG. 9 is a schematic flowchart of a data transmission method according to another embodiment of the present application.

FIG. 9 is a schematic flowchart of a data transmission method according to another embodiment of the present application. In this embodiment of the present application, an application scenario of uplink data transmission is described, where second UE adds terminal identifier information of first UE and a first RBID to data. As shown in FIG. 9, the data transmission method in this embodiment of the present application may include:

Step S901. First user equipment sends, to second user equipment, data that needs to be sent.

When needing to send the data, the first UE may directly send, to the second UE, the data that needs to be sent.

Step S902. The second user equipment receives, by using a third radio bearer entity, the data sent by the first user equipment.

The second UE may receive, by using the third RB entity used to communicate with the first UE, the data sent by the first UE. The second UE may include a third PDCP layer used to communicate with the first UE, the third PDCP layer includes at least one PDCP processing process, each PDCP processing process corresponds to a third RB entity, and the third RB entity is used for communication between the second UE and the first UE. In this embodiment of the present application, the network side device configures that a first RB of the first UE is in a one-to-one correspondence with a third RB of the second UE, and the second UE may pre-establish a correspondence between the third RB and terminal identifier information of the first UE and a first RBID.

In an optional embodiment, when a third PDCP entity layer used to communicate with the first UE is configured for the second UE, the second UE receives, on the third PDCP entity layer, the data sent by the first UE.

In an optional embodiment, when a third PDCP layer is not configured for the second UE, the second UE receives, on a third RLC entity layer, the data sent by the first UE.

Step S903. The second user equipment determines that the data is data that needs to be forwarded.

In a specific implementation, the second UE may determine, based on a transmission link attribute of the data, that the data is the data that needs to be forwarded.

Step S904. The second user equipment obtains first radio bearer identifier information of the data and terminal identifier information of the first user equipment based on a pre-established correspondence between the third radio bearer entity and the first radio bearer identifier information and the terminal identifier information.

Step S905. The second user equipment adds the first radio bearer identifier information and the terminal identifier information to the data.

In an optional embodiment, the second UE may add the first RBID and the terminal identifier information to the data based on the transmission link attribute of the data.

In an optional embodiment, after receiving, on the third PDCP entity layer, the data sent by the first UE, the second UE may add, on the third PDCP entity layer, the first RBID and the terminal identifier information to the data.

In an optional embodiment, after receiving, on the third RLC entity layer, the data sent by the first UE, the second UE may add, on the third RLC entity layer, the first RBID and the terminal identifier information to the data.

In an optional embodiment, the second UE may add, on a fourth PDCP entity layer, a fourth RLC entity layer, or a fourth MAC entity layer used to communicate with the network side device, the first RBID and the terminal identifier information to the data.

It should be noted that the second UE adds, on layers including but not limited to the foregoing entity layers, the terminal identifier information to the data. For example, the second UE may add, on an adaptation layer, the terminal identifier information to the data. Specifics are not limited in this embodiment of the present application.

Step S906. The second user equipment sends the data to which the first radio bearer identifier information and the terminal identifier information are added to a network side device.

Step S907. The network side device determines a data type of the data based on the first RBID, and determines that a source transmit end of the data is the first user equipment based on the terminal identifier information.

In the embodiment shown in FIG. 9, the first UE sends, to the second UE, the data that needs to be sent, and the second UE receives, by using the third RB entity, the data sent by the first UE, obtains the first RBID of the data and the terminal identifier information of the first UE based on the pre-established correspondence between the third RB entity and the first RBID and the terminal identifier information, adds the first RBID and the terminal identifier information to the data, and sends the data to which the first RBID and the terminal identifier information are added to the network side device, so that the network side device conveniently identifies the source transmit end and the data type of the received data.

Figure 10:
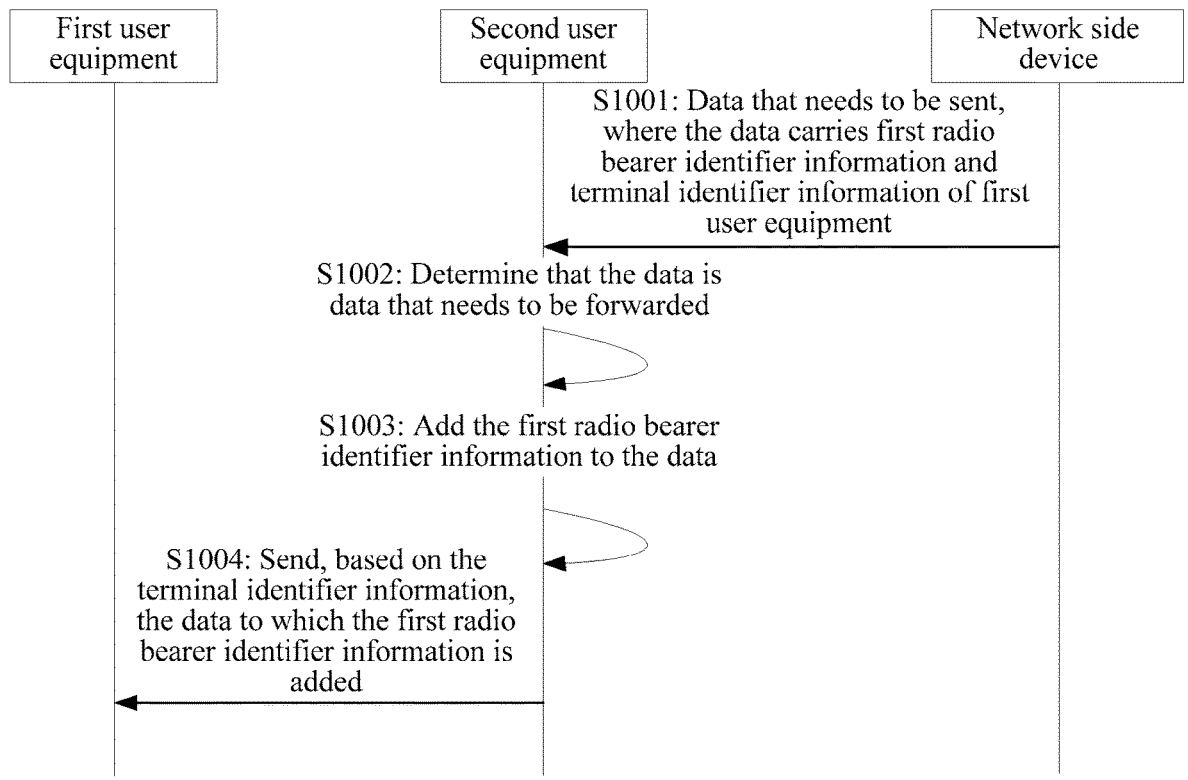
FIG. 10 is a schematic flowchart of a data transmission method according to another embodiment of the present application.

FIG. 10 is a schematic flowchart of a data transmission method according to another embodiment of the present application. In this embodiment of the present application, an application scenario of downlink data transmission is described, where second UE adds a first RBID to data. As shown in FIG. 10, the data transmission method in this embodiment of the present application may include:

Step S1001. A network side device sends, to second user equipment, data that needs to be sent, where the data carries first radio bearer identifier information and terminal identifier information of first user equipment.

Step S1002. The second user equipment determines that the data is data that needs to be forwarded.

After receiving the data sent by the network side device, the second UE may determine whether the data is the data that needs to be forwarded. When the data is the data that needs to be forwarded, the second UE may send the data to the first UE corresponding to the terminal identifier information. When the data is not the data that needs to be forwarded, the second UE may directly process the data.

In an optional embodiment, the second UE may determine, based on the first RBID and/or the terminal identifier information, that the data is the data that needs to be forwarded. Specifically, if the network side device intends to send the data to only the second UE, the network side device may not add the first RBID and/or the terminal identifier information, and directly send the data to the second UE.

The data received by the second UE does not include the first RBID or the terminal identifier information. If the network side device intends to send the data to the second UE, so that the second UE forwards the data to the first UE, the network side device may add the first RBID and/or the terminal identifier information, and send the data to which the first RBID and/or the terminal identifier information is added to the second UE. The data received by the second UE includes the first RBID or the terminal identifier information. In other words, the second UE may determine whether the received data includes the first RBID or the terminal identifier information, and when the received data includes the first RBID or the terminal identifier information, the second UE may determine that the data is the data that needs to be forwarded.

In an optional embodiment, when the second UE obtains the data packet from a second RB configured on a network side, the second UE may determine that the data is the data that needs to be forwarded. The second RB is located between the second UE and the network side device, and the second RB is used to transmit one or more pieces of data whose source transmit end or destination transmit end is the first UE.

Step S1003. The second user equipment adds the first radio bearer identifier information to the data.

Step S1004. The second user equipment sends the data to which the first radio bearer identifier information is added to the first user equipment based on the terminal identifier information.

In an optional embodiment, when a third PDCP entity layer used to communicate with the first UE is configured for the second UE, and the third PDCP entity layer is in a one-to-one correspondence with a first RB entity of the first UE, the second UE may determine, based on the first RBID, the third PDCP entity layer corresponding to the first RB entity, delete, on the third PDCP entity layer, the first RBID and the terminal identifier information from the data, and send the data from which the first RBID and the terminal identifier information are deleted to the first UE by using the third PDCP entity layer.

When the third PDCP entity layer is not configured for the second UE, the second UE may determine, based on the first RBID, the third RLC entity layer corresponding to the first RB entity, delete, on the third RLC entity layer, the first RBID and the terminal identifier information from the data, and send the data from which the first RBID and the terminal identifier information are deleted to the first UE by using the third RLC entity layer.

In the embodiment shown in FIG. 10, the network side device sends, to the second UE, the data that needs to be sent, where the data carries the first RBID and the terminal identifier information of the first UE, and the second UE adds the first RBID to the data, and sends the data to which the first RBID is added to the first UE based on the terminal identifier information, so that the first UE conveniently identifies a data type of the received data.

Figure 11:
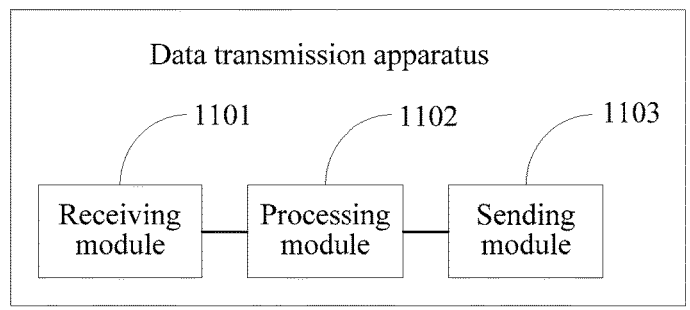
FIG. 11 is a schematic structural diagram of a data transmission apparatus according to an embodiment of the present application.

FIG. 11 is a schematic structural diagram of a data transmission apparatus according to an embodiment of the present application. The data transmission apparatus provided in this embodiment of the present application may be configured to implement some or all procedures in the embodiments of the data transmission methods described with reference to FIG. 3 to FIG. 8 in the present application. As shown in FIG. 11, the data transmission apparatus in this embodiment of the present application may include at least a processing module 1101 and a sending module 1102.

The processing module 1101 is configured to add a first RBID and/or terminal identifier information of first UE to data that needs to be forwarded, where a first RB corresponding to the first RBID is located between the first UE and a network side device.

The sending module 1102 is configured to send the data to second UE, so that the second UE forwards the data, where the data includes the first RBID and/or the terminal identifier information added by the processing module 1101.

In an optional embodiment, the processing module 1101 is specifically configured to add the first RBID and/or the terminal identifier information of the first UE to a header of a data packet including the data.

In an optional embodiment, the apparatus in this embodiment of the present application may further include:

a receiving module 1103, configured to receive data of the network side device that is forwarded by the second UE, where the data carries the first RBID.

The processing module 1101 is further configured to obtain, based on the first RBID, a data type of the data received by the receiving module 1103, where the data type includes a service or signaling.

In an optional embodiment, the sending module 1102 is specifically configured to send the data to which the first RBID and/or the terminal identifier information is added to the second UE by using a pre-established communication connection to the second UE, so that the second UE sends the data to which the first RBID and/or the terminal identifier information is added to the network side device, where the communication connection includes a D2D connection, a Bluetooth connection, or a WiFi connection.

In an optional embodiment, the modules of the apparatus are located on a PDCP processing layer used for communication between the first UE and the second UE, or located on a PDCP processing layer used for communication between the first UE and the network side device, or located on an RLC entity layer used for communication between the first UE and the second UE.

It should be noted that in this embodiment of the present application, an entity device corresponding to the processing module 1101 is a processor, an entity device corresponding to the receiving module 1103 is a receiver, and an entity device corresponding to the sending module 1102 is a transmitter. Specifics are not limited in this embodiment of the present application.

FIG. 11 is a schematic structural diagram of a data transmission apparatus according to an embodiment of the present application. The data transmission apparatus provided in this embodiment of the present application may be configured to implement some or all procedures in the embodiments of the data transmission methods described with reference to FIG. 3 to FIG. 8 in the present application. As shown in FIG. 11, the data transmission apparatus in this embodiment of the present application may include at least a receiving module 1103, a processing module 1101, and a sending module 1102.

The receiving module 1103 is configured to receive data sent by first UE, where the data carries a first RBID and/or terminal identifier information of the first UE.

The processing module 1101 is configured to determine that the data received by the receiving module 1103 is data that needs to be forwarded.

The sending module 1102 is configured to send the data processed by the processing module 1101 to the network side device.

In an optional embodiment, the receiving module 1103 is further configured to receive data sent by a network side device, where the data carries the first RBID and/or the terminal identifier information of the first UE.

The processing module 1101 is further configured to determine that the data is data that needs to be forwarded.

The sending module 1102 is further configured to send the data to the first UE based on the terminal identifier information.

In an optional embodiment, when determining that the data is the data that needs to be forwarded, the processing module 1101 is specifically configured to: determine, based on the first RBID and/or the terminal identifier information, that the data is the data that needs to be forwarded.

In an optional embodiment, when determining that the data is the data that needs to be forwarded, the processing module 1101 is specifically configured to: determine, based on a transmission link attribute of the data, that the data is the data that needs to be forwarded, where the transmission link attribute is used to indicate that a transmission link between the first UE and the second UE is in a one-to-one correspondence with a first RB between the first UE and the network side device, and the transmission link attribute includes an identifier indicating whether the data needs to be forwarded.

It should be noted that in this embodiment of the present application, an entity device corresponding to the processing module 1101 is a processor, an entity device corresponding to the receiving module 1103 is a receiver, and an entity device corresponding to the sending module 1102 is a transmitter. Specifics are not limited in this embodiment of the present application.

FIG. 11 is a schematic structural diagram of a data transmission apparatus according to an embodiment of the present application. The data transmission apparatus provided in this embodiment of the present application may be configured to implement some or all procedures in the embodiments of the data transmission methods described with reference to FIG. 3 to FIG. 8 in the present application. As shown in FIG. 11, the data transmission apparatus in this embodiment of the present application may include at least a receiving module 1103 and a processing module 1101.

The receiving module 1103 is configured to receive data of first UE that is forwarded by second UE, where the data carries a first RBID and/or terminal identifier information of the first UE, and a first RB corresponding to the first RBID is located between the first UE and a network side device.

The processing module 1101 is configured to: determine, based on the first RBID, a data type of the data received by the receiving module 1103, and determine, based on the terminal identifier information, that a source transmit end of the data received by the receiving module 1103 is the first UE, where the data type includes a service or signaling.

In an optional embodiment, the processing module 1101 is further configured to process, by using a PDCP processing process corresponding to the first RBID and the terminal identifier information, the data received by the receiving module 1103, where the PDCP processing process is in a one-to-one correspondence with the first RBID and the terminal identifier information.

It should be noted that in this embodiment of the present application, an entity device corresponding to the processing module 1101 is a processor, an entity device corresponding to the receiving module 1103 is a receiver, and an entity device corresponding to the sending module 1102 is a transmitter. Specifics are not limited in this embodiment of the present application.

FIG. 11 is a schematic structural diagram of a data transmission apparatus according to an embodiment of the present application. The data transmission apparatus provided in this embodiment of the present application may be configured to implement some or all procedures in the embodiments of the data transmission methods described with reference to FIG. 3 to FIG. 8 in the present application. As shown in FIG. 11, the data transmission apparatus in this embodiment of the present application may include at least a processing module 1101 and a sending module 1102.

The processing module 1101 is configured to obtain a first RBID of data that needs to be transmitted and/or terminal identifier information of first UE.

The processing module 1101 is further configured to add the first RBID and/or the terminal identifier information to the data.

The sending module 1102 is configured to send the data to which the first RBID and/or the terminal identifier information is added to second UE, so that the second UE forwards the data to the first UE.

It should be noted that in this embodiment of the present application, an entity device corresponding to the processing module 1101 is a processor, an entity device corresponding to the receiving module 1103 is a receiver, and an entity device corresponding to the sending module 1102 is a transmitter. Specifics are not limited in this embodiment of the present application.

FIG. 11 is a schematic structural diagram of a data transmission apparatus according to an embodiment of the present application. The data transmission apparatus provided in this embodiment of the present application may be configured to implement some or all procedures in the embodiments of the data transmission methods described with reference to FIG. 5 to FIG. 10 in the present application. As shown in FIG. 11, the data transmission apparatus in this embodiment of the present application may include at least a receiving module 1103, a processing module 1101, and a sending module 1102.

The receiving module 1103 is configured to receive, by using a third RB entity used to communicate with the first UE, data sent by first UE.

The processing module 1101 is configured to obtain a first RBID of the data received by the receiving module 1103 and/or terminal identifier information of the first UE based on a pre-established correspondence between a third RB entity and the first RBID and/or the terminal identifier information.

The processing module 1101 is further configured to add the first RBID and/or the terminal identifier information to the data.

The sending module 1102 is configured to send the data to a network side device, where the data includes the first RBID and/or the terminal identifier information added by the processing module 1101.

In an optional embodiment, the processing module 1101 is further configured to: after obtaining the first RBID of the data and/or the terminal identifier information of the first UE, determine, based on the first RBID and/or the terminal identifier information, that the data is data that needs to be forwarded; or the processing module 1101 is further configured to: after obtaining the first RBID of the data and/or the terminal identifier information of the first UE, determine, based on a transmission link attribute of the data, that the data is data that needs to be forwarded.

In an optional embodiment, the processing module 1101 is specifically configured to:

add the first RBID and/or the terminal identifier information to the data based on the transmission link attribute of the data.

In an optional embodiment, the receiving module 1103 is specifically configured to:

when a third PDCP entity layer used to communicate with the first UE is configured for the second UE, receive, on the third PDCP entity layer, the data sent by the first UE; and the processing module 1101 is specifically configured to:

add, on the third PDCP entity layer, the first RBID and/or the terminal identifier information to the data.

In an optional embodiment, the receiving module 1103 is specifically configured to:

when a third PDCP entity layer used to communicate with the first UE is not configured for the second UE, receive, on a third RLC entity layer used to communicate with the first UE, the data sent by the first UE; and the processing module 1101 is specifically configured to:

add, on the third RLC entity layer, the first RBID and/or the terminal identifier information to the data.

In an optional embodiment, the processing module 1101 is specifically configured to:

add, on a fourth PDCP entity layer, a fourth RLC entity layer, or a fourth MAC entity layer used to communicate with the network side device, the first RBID and/or the terminal identifier information to the data.

It should be noted that in this embodiment of the present application, an entity device corresponding to the processing module 1101 is a processor, an entity device corresponding to the receiving module 1103 is a receiver, and an entity device corresponding to the sending module 1102 is a transmitter. Specifics are not limited in this embodiment of the present application.

FIG. 11 is a schematic structural diagram of a data transmission apparatus according to an embodiment of the present application. The data transmission apparatus provided in this embodiment of the present application may be configured to implement some or all procedures in the embodiments of the data transmission methods described with reference to FIG. 5 to FIG. 10 in the present application. As shown in FIG. 11, the data transmission apparatus in this embodiment of the present application may include at least a receiving module 1103, a processing module 1101, and a sending module 1102.

The receiving module 1103 is configured to receive data sent by a network side device, where the data carries a first RBID and/or terminal identifier information of first UE, and a first RB corresponding to the first RBID is located between the first UE and the network side device.

The processing module 1101 is configured to determine, based on the first RBID and/or the terminal identifier information, that the data received by the receiving module 1103 is data that needs to be forwarded.

The sending module 1102 is configured to send the data to the first UE based on the terminal identifier information.

In an optional embodiment, when sending the data to the first UE based on the terminal identifier information, the sending module 1102 is specifically configured to:

when a third PDCP entity layer used to communicate with the first UE is configured for the second UE, and the third PDCP entity layer is in a one-to-one correspondence with a first RB entity of the first UE, determine, based on the first RBID and/or the terminal identifier information, the third PDCP entity layer corresponding to the first RB entity;

delete, on the third PDCP entity layer, the first RBID and/or the terminal identifier information from the data; and send the data from which the first RBID and/or the terminal identifier information is deleted to the first UE by using the third PDCP entity layer.

In an optional embodiment, when sending the data to the first UE corresponding to the terminal identifier information, the sending module 1102 is specifically configured to:

when a third PDCP entity layer used to communicate with the first UE is not configured for the second UE, determine, based on the first RBID and/or the terminal identifier information, a third RLC entity layer corresponding to a first RB entity, where the third RLC entity layer is used for communication between the second UE and the first UE;

delete, on the third RLC entity layer, the first RBID and/or the terminal identifier information from the data; and send the data from which the first RBID and/or the terminal identifier information is deleted to the first UE by using the third RLC entity layer.

It should be noted that in this embodiment of the present application, an entity device corresponding to the processing module 1101 is a processor, an entity device corresponding to the receiving module 1103 is a receiver, and an entity device corresponding to the sending module 1102 is a transmitter. Specifics are not limited in this embodiment of the present application.

FIG. 11 is a schematic structural diagram of a data transmission apparatus according to an embodiment of the present application. The data transmission apparatus provided in this embodiment of the present application may be configured to implement some or all procedures in the embodiments of the data transmission methods described with reference to FIG. 5 to FIG. 10 in the present application. As shown in FIG. 11, the data transmission apparatus in this embodiment of the present application may include at least a sending module 1102 and a processing module 1101.

The sending module 1102 is configured to send, to a second RB entity layer by using a fifth PDCP entity layer, data that needs to be sent, where a first RBID and/or terminal identifier information of first UE are carried, and the first RBID is used by a network side device to identify a first RB of the first UE.

The processing module 1101 is configured to add, on the second RB entity layer, the first RBID and/or the terminal identifier information to the data.

The sending module 1102 is further configured to send the data to second UE by using the second RB entity layer, where the data includes the first RBID and/or the terminal identifier information added by the processing module 1101.

In an optional embodiment, the network side device may further include a fifth RLC layer communicating with the first UE. The sending module 1102 is configured to send, to the second RB entity layer by using the fifth RLC entity layer, the data that needs to be sent.

It should be noted that in this embodiment of the present application, an entity device corresponding to the processing module 1101 is a processor, an entity device corresponding to the receiving module 1103 is a receiver, and an entity device corresponding to the sending module 1102 is a transmitter. Specifics are not limited in this embodiment of the present application.

Figure 12:
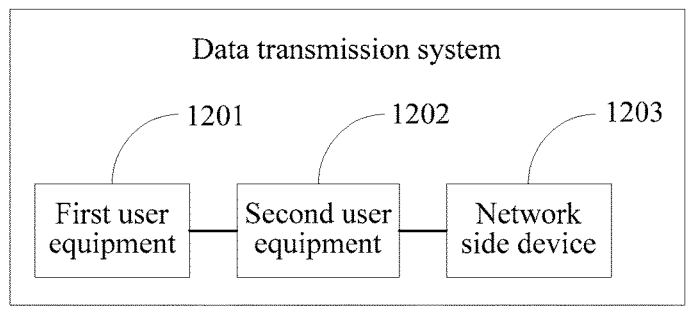
FIG. 12 is a schematic structural diagram of a data transmission system according to an embodiment of the present application.

FIG. 12 shows a data transmission system according to an embodiment of the present application. The data transmission system in this embodiment of the present application may be configured to implement some or all procedures in the embodiments of the data transmission methods described with reference to FIG. 3 and FIG. 4 in the present application. The data transmission system includes first UE 1201, second UE 1202, and a network side device 1203.

The first UE 1201 adds a first RBID and terminal identifier information of the first UE to data, and sends the data to which the first RBID and the terminal identifier information are added to the second UE 1202.

The second UE 1202 determines that the data is data that needs to be forwarded, and sends the data to the network side device.

The network side device 1203 determines a data type of the data based on the first RBID, and determines that a source transmit end of the data is the first UE based on the terminal identifier information, where the data type includes a service or signaling.

FIG. 12 shows a data transmission system according to an embodiment of the present application. The data transmission system in this embodiment of the present application may be configured to implement some or all procedures in the embodiments of the data transmission methods described with reference to FIG. 5 and FIG. 6 in the present application. The data transmission system includes first UE 1201, second UE 1202, and a network side device 1203.

The first UE 1201 sends, to the second UE 1202 by using a first RB entity of the first UE 1201, data that needs to be sent, where the data carries a first RBID, and the first RBID is used by the network side device 1203 to identify a first RB of the first UE 1201.

The second UE 1202 receives, by using a third RB entity used to communicate with the first UE 1201, the data sent by the first UE 1201, obtains terminal identifier information of the first UE 1201 based on a pre-established correspondence between the third RB entity and the terminal identifier information of the first UE, adds the terminal identifier information to the data, and sends the data that carries the first RBID and the terminal identifier information to the network side device 1203, where the third RB entity is used for communication between the first UE 1201 and the second UE 1202.

The network side device 1203 determines a data type of the data based on the first RBID, and determines that a source transmit end of the data is the first UE 1201 based on the terminal identifier information.

FIG. 12 shows a data transmission system according to an embodiment of the present application. The data transmission system in this embodiment of the present application may be configured to implement some or all procedures in the embodiments of the data transmission methods described with reference to FIG. 7 and FIG. 8 in the present application. The data transmission system includes first UE 1201, second UE 1202, and a network side device 1203.

The first UE 1201 sends, to the second UE 1202 by using a first RB entity of the first UE 1201, data that needs to be sent, where the data carries terminal identifier information of the first UE.

The second UE 1202 receives, by using a third RB entity used to communicate with the first UE 1201, the data sent by the first UE 1201, obtains a first RBID of the data based on a pre-established correspondence between the third RB entity and the first RBID, adds the first RBID to the data, and sends the data that carries the first RBID and the terminal identifier information to the network side device 1203, where the third RB entity is used for communication between the first UE 1201 and the second UE 1202.

The network side device 1203 determines a data type of the data based on the first RBID, and determines that a source transmit end of the data is the first UE 1201 based on the terminal identifier information.

FIG. 12 shows a data transmission system according to an embodiment of the present application. The data transmission system in this embodiment of the present application may be configured to implement some or all procedures in the embodiments of the data transmission methods described with reference to FIG. 9 and FIG. 10 in the present application. The data transmission system includes first UE 1201, second UE 1202, and a network side device 1203.

The first UE 1201 sends, to the second UE 1202 by using a first RB entity of the first UE 1201, data that needs to be sent, where the first RB entity is used to transmit data between the first UE 1201 and the network side device 1203.

The second UE 1202 receives, by using a third RB entity used to communicate with the first UE 1201, the data sent by the first UE 1201, obtains a first RBID of the data and terminal identifier information of the first UE 1201 based on a pre-established correspondence between the third RB entity and the first RBID and the terminal identifier information, adds the first RBID and the terminal identifier information to the data, and sends the data to which the first RBID and the terminal identifier information are added to the network side device 1203, where the third RB entity is used for communication between the first UE 1201 and the second UE 1202.

The network side device 1203 determines a data type of the data based on the first RBID, and determines that a source transmit end of the data is the first UE based on the terminal identifier information.

It should be noted that, in the foregoing embodiments, the description of each embodiment has respective focuses. For a part that is not described in detail in an embodiment, refer to related descriptions in other embodiments. In addition, a person skilled in the art should also appreciate that all the embodiments described in the specification are example embodiments, and the related actions and modules are not necessarily mandatory to the embodiments of the present application.

A sequence of the steps of the method in the embodiments of the present application may be adjusted, and certain steps may also be merged or removed according to an actual need.

The modules in the apparatus in the embodiments of the present application may be combined, divided, and deleted according to an actual requirement.

The units of the embodiments of the present application may be executed by a universal integrated circuit, such as a CPU (Central Processing Unit) or an ASIC (Application Specific Integrated Circuit).

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM), or a random access memory (RAM).

What is disclosed above is merely example embodiments of the present application, and certainly is not intended to limit the protection scope of the present application. Therefore, equivalent variations made in accordance with the claims of the present application shall fall within the scope of the present application.

What is claimed is:

1. A data transmission method, comprising:
   receiving, by a second terminal device, from a second radio bearer entity, data sent by a first terminal device, wherein the data carries no radio bearer identifier information and no terminal identifier information of the first terminal device, wherein a first radio bearer entity corresponding to the radio bearer identifier information is located between the first terminal device and a network side device, the radio bearer identifier information is allocated to the first terminal device by the network side device, the terminal identifier information is a layer 2 identifier of the first terminal device, the layer 2 identifier is used to instruct an access network to identify the first terminal device, and the terminal identifier information comprises a cell radio network temporary identifier, an Internet Protocol address, a temporary identity code, or an international mobile subscriber identity;

obtaining, by the second terminal device, first radio bearer identifier information of the data sent by the first terminal device and terminal identifier information of the first terminal device based on a pre-established correspondence between the second radio bearer entity and the first radio bearer identifier information and the terminal identifier information;

adding, by the second terminal device, the first radio bearer identifier information and the terminal identifier information to the data sent by the first terminal device;

determining, by the second terminal device, that the data to which the first radio bearer identifier information and the terminal identifier information are added is data that needs to be forwarded; and sending, by the second terminal device, the data to which the first radio bearer identifier information and the terminal identifier information are added to the network side device to enable the network side device to determine a data type of the received data based on the first radio bearer identifier information, and to determine that a source transmit end of the received data is the first terminal device based on the terminal identifier information.

2. The method according to claim 1, wherein the method further comprises:
receiving, by the second terminal device, data sent by the network side device, wherein the data sent by the network side device carries either 1) the first radio bearer identifier information and the terminal identifier information of the first terminal device or 2) the terminal identifier information of the first terminal device;
determining, by the second terminal device, that the data sent by the network side device is data that needs to be forwarded; and
sending, by the second terminal device, the data sent by the network side device to the first terminal device based on the terminal identifier information.

3. The method according to claim 1, wherein the determining, by the second terminal device, that the data sent by the network side device is data that needs to be forwarded comprises:
determining, by the second terminal device based on the first radio bearer identifier information and/or the terminal identifier information, that the data sent by the network side device is the data that needs to be forwarded.

4. The method according to claim 1, wherein the determining, by the second terminal device, that the data sent by the network side device is data that needs to be forwarded comprises:
determining, by the second terminal device based on a transmission link attribute of the data, that the data is the data that needs to be forwarded, wherein the transmission link attribute is used to indicate that a transmission link between the first terminal device and the second terminal device is in a one-to-one correspondence with the first radio bearer between the first terminal device and the network side device, and the transmission link attribute comprises an identifier indicating whether the data needs to be forwarded.

5. A data transmission apparatus, comprising:
a receiver, configured to receive, from a second radio bearer entity, data sent by a first terminal device, wherein the data carries no radio bearer identifier information and no terminal identifier information of the first terminal device, wherein a first radio bearer entity corresponding to the first radio bearer identifier information is located between the first terminal device and a network side device, the first radio bearer identifier information is allocated to the first terminal device by the network side device, the terminal identifier information is a layer 2 identifier of the first terminal device, the layer 2 identifier is used to instruct an access network to identify the first terminal device, and the terminal identifier information comprises a cell radio network temporary identifier, an Internet Protocol address, a temporary identity code, or an international mobile subscriber identity;
a processor, configured to:
obtain first radio bearer identifier information of the data sent by the first terminal device and terminal identifier information of the first terminal device based on a pre-established correspondence between the second radio bearer entity and the first radio bearer identifier information and the terminal identifier information;
add the first radio bearer identifier information and the terminal identifier information to the data sent by the first terminal device; and
determine that the data received by the receiver is data that needs to be forwarded; and
a transmitter, configured to send the data to which the first radio bearer identifier information and the terminal identifier information are added to the network side device to enable the network side device to determine a data type of the data received by the network side device based on the first radio bearer identifier information, and to determine that a source transmit end of the data received by the network side device is the first terminal device based on the terminal identifier information.

6. The apparatus according to claim 5, wherein
the receiver is further configured to receive data sent by the network side device, wherein the data carries either 1) the first radio bearer identifier information and the terminal identifier information of the first terminal device, or 2) the terminal identifier information of the first terminal device;
the processor is further configured to determine that the data sent by the network side device is data that needs to be forwarded; and
the transmitter is further configured to send the data sent by the network side device to the first terminal device based on the terminal identifier information.

7. The apparatus according to claim 5, wherein the processor is configured to:
determine, based on either or both of the first radio bearer identifier information and the terminal identifier information, that the data sent by the network side device is the data that needs to be forwarded.

8. The apparatus according to claim 5, wherein the processor is configured to:
determine, based on a transmission link attribute of the data sent by the network side device, that the data sent by the network side device is the data that needs to be forwarded, wherein the transmission link attribute is used to indicate that a transmission link between the first terminal device and the second terminal device is in a one-to-one correspondence with the first radio bearer entity between the first terminal device and the network side device, and the transmission link attribute comprises an identifier indicating whether the data sent by the network side device needs to be forwarded.

9. A data transmission system, comprising: a first terminal device, a second terminal device, and a network side device, wherein
the first terminal device sends, to the second terminal device using a first radio bearer entity of the first terminal device, first data that needs to be sent, wherein the first radio bearer entity is used to transmit data between the first terminal device and the network side device;
the second terminal device receives, using a second radio bearer entity used to communicate with the first terminal device, the first data sent by the first terminal device, obtains first radio bearer identifier information of the data and terminal identifier information of the first terminal device based on a pre-established correspondence between the second radio bearer entity and the first radio bearer identifier information and the terminal identifier information, adds the first radio bearer identifier information and the terminal identifier information to the first data, and sends the data to which the first radio bearer identifier information and the terminal identifier information are added to the network side device, wherein the second radio bearer entity is used for communication between the first terminal device and the second terminal device, a first radio bearer corresponding to the first radio bearer identifier information is located between the first terminal device and the network side device, the first radio bearer identifier information is allocated to the first terminal device by the network side device, the terminal identifier information is a layer 2 identifier of the first terminal device, the layer 2 identifier is used to instruct an access network to identify the first terminal device, and the terminal identifier information comprises a cell radio network temporary identifier, an Internet Protocol address, a temporary identity code, or an international mobile subscriber identity; and
the network side device determines a data type of the data received by the network side device based on the first radio bearer identifier information, and determines that a source transmit end of the data received by the network side device is the first terminal device based on the terminal identifier information.

10. A non-transitory computer-readable storage medium comprising instructions which, when executed by a processor in a computer, cause the computer to carry out steps:
receiving, from a second radio bearer entity, data sent by a first terminal device, wherein the data carries no radio bearer identifier information and no terminal identifier information of the first terminal device, wherein a first radio bearer entity corresponding to the radio bearer identifier information is located between the first terminal device and a network side device, the radio bearer identifier information is allocated to the first terminal device by the network side device, the terminal identifier information is a layer 2 identifier of the first terminal device, the layer 2 identifier is used to instruct an access network to identify the first terminal device, and the terminal identifier information comprises a cell radio network temporary identifier, an Internet Protocol address, a temporary identity code, or an international mobile subscriber identity;
obtaining first radio bearer identifier information of the data sent by the first terminal device and terminal identifier information of the first terminal device based on a pre-established correspondence between the second radio bearer entity and the first radio bearer identifier information and the terminal identifier information;
adding the first radio bearer identifier information and the terminal identifier information to the data sent by the first terminal device;
determining that the data to which the first radio bearer identifier information and the terminal identifier information are added is data that needs to be forwarded; and
sending the data to which the first radio bearer identifier information and the terminal identifier information are added to the network side device to enable the network side device to determine a data type of the received data based on the first radio bearer identifier information, and to determine that a source transmit end of the received data is the first terminal device based on the terminal identifier information.

* * * * *